(12) United States Patent
Hoopes et al.

(10) Patent No.: US 11,388,183 B2
(45) Date of Patent: Jul. 12, 2022

(54) SYSTEMS AND METHODS FOR TRACKING RISK ON DATA MAINTAINED IN COMPUTER NETWORKED ENVIRONMENTS

(71) Applicant: Digital Guardian LLC, Waltham, MA (US)

(72) Inventors: Jaimen Dee Hoopes, Lehi, UT (US); Christian J Weibel, Lindon, UT (US); Christian Paul Larsen, Sandy, UT (US)

(73) Assignee: Digital Guardian LLC, Waltham, MA (US)

( * ) Notice: Subject to any disclaimer, the term of this patent is extended or adjusted under 35 U.S.C. 154(b) by 451 days.

(21) Appl. No.: 16/424,194

(22) Filed: May 28, 2019

(65) Prior Publication Data

US 2020/0382543 A1    Dec. 3, 2020

(51) Int. Cl.
  *H04L 9/40*    (2022.01)

(52) U.S. Cl.
  CPC ...... *H04L 63/1433* (2013.01); *H04L 63/1441* (2013.01); *H04L 63/168* (2013.01); *H04L 63/20* (2013.01)

(58) Field of Classification Search
  CPC ... H04L 63/20; H04L 63/102; H04L 63/1441; H04L 63/168; H04L 63/1433; G06F 16/9024; G06F 17/18
  See application file for complete search history.

(56) References Cited

U.S. PATENT DOCUMENTS

| 9,311,499 B2 * | 4/2016 | Redlich | G06F 21/6209 |
| 2007/0244877 A1 * | 10/2007 | Kempka | G06F 16/10 |
| 2017/0041296 A1 * | 2/2017 | Ford | G06F 16/951 |
| 2019/0268379 A1 * | 8/2019 | Narayanaswamy | H04L 63/20 |

FOREIGN PATENT DOCUMENTS

| WO | WO-03/012666 A1 | 2/2003 | |
| WO | WO-03012666 A1 * | 2/2003 | H04L 63/20 |

* cited by examiner

*Primary Examiner* — Matthew Smithers
*Assistant Examiner* — Shu Chun Gao
(74) *Attorney, Agent, or Firm* — Fredrikson & Byron, P.A.

(57) ABSTRACT

Provided herein are systems and methods for risk tracking. A tracker engine executable on servers may provide, in a user interface, a plurality of categories of locations for files in a networked environment. The tracker engine may identify in the user interface risk categories of the files in each of the categories of the locations. The tracker engine may provide, in the user interface, types of egress points for the files. The tracker engine may generate links between the categories of the locations of the files, the risk categories of the files and the types of egress points for the files. Details about each of the files may be navigable from the user interface via a corresponding category of a location of the file, a corresponding risk category of the file or a corresponding type of egress point for the file.

20 Claims, 21 Drawing Sheets

| | | | | 655 | | | 660A-N |
|---|---|---|---|---|---|---|---|
| Forensic Details | | | | | | | |
| 📅 10/29/2017 10:30 AM - 10/29/2017 11:30 AM | | | | | | | |

> Left Click: A Click in the Event area will drop the user on the Forensic Details with +-30minutes from the time selection in the timeline...Mouse hover will show the 30 min time range

| EVENT DETAILS 665 | | | | |
|---|---|---|---|---|
| Event Time ▽ | Operation Type 670 | User 675 | Computer Name.. 680 | Application 685 |
| 10/27/17 2:05:05 pm | File Copy | tthemelis | verdasys.com\p... | sharedfilelis |
| 10/27/17 2:04:59 pm | File Copy | tthemelis | verdasys.com\p... | Cisco Jabbe |
| 10/27/17 2:04:59 pm | File Copy | tthemelis | verdasys.com\p... | Cisco Jabbe |
| 10/27/17 2:04:57 pm | File Copy | tthemelis | verdasys.com\p... | networkserv |
| 10/27/17 2:04:57 pm | File Copy | tthemelis | verdasys.com\p... | networkserv |

FIG. 6E

Entity List: Users (High Risk)

Select an entity to view risk details.

Filters: [icons]

| Entity | Risk Score |
|---|---|
| dg\dbird | ⚠ 82 |
| dg\jfogergren | ⚠ 82 |
| dg\clarsen | ⚠ 82 |
| dgdemo\cnuss-win10x64 | ⚠ 80 |
| workgroup\cessocean | ⚠ 79 |
| workgroup\hhawkins | ⚠ 76 |

Showing 6 of 6

SYSTEMS AND METHODS FOR TRACKING RISK ON DATA MAINTAINED IN COMPUTER NETWORKED ENVIRONMENTS

TECHNICAL FIELD

The present application relates generally to systems and methods for risk tracking, including but not limited to systems and methods for risk tracking on data maintained in computer networked environments.

BACKGROUND

Data (e.g., files) may be maintained in a computer networked environment. A user operating a computing device or an application running on the computing device may move some of the data from one location to another location within the computer networked environment.

SUMMARY

Described herein are systems and methods for risk tracking. Data in the form of one or more files may be accessed through a networked environment in response to a command from an entity to modify, replicate, or transfer the files. A user operating an application running on a computing device in the networked environment may access one of the files maintained on the computing device itself or a remote data storage via the network. The application itself may also access one of the files stored throughout the networked environment as part of the execution of the instruction set (e.g., in a process or a thread) for the application. In addition, the computing device itself may access files as part of a background process in editing, copying, or moving the data.

Attempts to access data maintained throughout the networked environment may entail risk to the data themselves. For example, data transferred over unencrypted channels may pose a higher risk than data transferred over encrypted channels, as potentially malevolent parties may have easier access to the data in the unencrypted channels versus the data in encrypted channels. Each attempt at accessing a file and various attributes of the attempt may be tracked and recorded. Furthermore, a level of potential risk in accessing the file may be evaluated and assessed. The information gathered from the accessing of the files may be used to diagnose and detect security risks to the data maintained throughout the networked environment. But there may be a myriad of challenges in making use of the information regarding the accessing of data throughout the networked environment. For one, the logging of each attempted access of a file, the attributes of the attempt, and the level of potential risk may not be correlated or determined to be associated with one another. For another, the information regarding the access may not be presented in a single viewport of a graphical interface and viewed through several, separate graphical user interfaces, thus impeding the ability to use of the information in diagnostics. Without such capabilities, the data in the networked environment may remain vulnerable to security risks.

To address the technical challenges, a risk tracking system may provide a graphical user interface (e.g., an executive risk dashboard) detailing locations of each file in the computer networked environment together with a risk category and an egress point for the file. The risk tracking system may gather and aggregate information regarding the risk to the data maintained across in the networked environment. The information may include locations for files in the network, risk categories of the files in each location, and egress points for the files, among others. The files may be stored, for example, on a client local hard drive, a remote database, a file-sharing service, or a cloud service, among others. For each location in the network, the risk tracking system may identify risk categories for the file in the location. The identification of the risk category may be based on a number of parameters, such as the location itself, contents of the files, and a level of encryption of the file, among others. The risk category may designate a level of sensitivity of the files stored in the location and may also indicate a degree of potential security threats to the location. The risk tracking system may also identify types of egress points for the files in the network. The types of egress points may include any media or operations through which the files from the location may be transferred. Examples of egress point types may include electronic mail, removable disk storage, printer, a copy function, or network upload, among others. In addition, the risk tracking system may keep track of the information over time, and may identify various events by entities in the networked environment affecting the risk categorization or egress points to the files.

Using the information gathered regarding the risk to the data, the risk tracking system may link together the information to one another. In linking, the risk tracking system may associate each location of the files with the identified risk category for the location. Furthermore, the risk tracking system may associate the files in the location with the identified egress point types. The risk tracking system may index the linked information over time by associating a time of events affecting the risk categorization or egress point types to the files in the networked environment. The associations among the information may be maintained using a data structure relating together the locations, risk categorizations, and the egress point types over time.

With the linking of the information regarding the risk to the data with one another, the risk tracking system may generate and present a graphical user interface (sometimes referred herein as an executive risk dashboard). Through the graphical user interface, the risk tracking system may display the links among the location of files, the risk categories of the files, and the types of egress points for the files, among others. The information may be navigable via the graphical user interface per location, risk category, or egress point type. In addition, the graphical user interface may present the locations of files, risk categories, and egress point types across time. In this manner, the risk tracking system may present where the data are located in the networked environment, how the data are transferred, any security threats to the data, potentially risky behavior in the networked environment, and overall trends via the graphical user interface. Using the information present on the graphical user interface, a network administrator may quickly diagnose and identify potential risks to the data maintained across the networked environment. Furthermore, the network administrator may identify causes in elevation of threats to security to the data maintained in the networked environment. Thus, the risk tracking system may improve the overall security and integrity of the data maintained in the networked environment.

At least one aspect of the present disclosure is directed to a system for risk tracking. The system may include a user interface. The system may include a tracker engine executable on one or more servers. The tracker engine may provide, in the user interface, a plurality of categories of locations for files in a networked environment. The tracker engine may identify, in the user interface, risk categories of the files in each of the categories of the locations. The tracker engine may provide, in the user interface, types of egress points for the files. The tracker engine may generate, in the user interface, links between the categories of the locations of the files, the risk categories of the files and the types of egress points for the files. Details about each of the files may be navigable from the user interface via a corresponding category of a location of the file, a corresponding risk category of the file or a corresponding type of egress point for the file.

In some embodiments, the plurality of categories of locations may include at least one of: a database, a file-share application, an end-point, or a server cloud. In some embodiments, the risk categories of the files may include at least one of: classified files, at-risk files, or secure files. In some embodiments, the types of egress points of the files may include at least one of: email, removable storage, printer, file copy, file move between locations, or network upload.

In some embodiments, the tracker engine may provide, for each of the types of egress points of the files, a count of the corresponding egress points and a count of events indicative of a threat associated with the corresponding egress points. In some embodiments, the tracker engine may generate an event graph comprising a risk trend graph indicative of an overall risk across entities in the networked environment over a plurality of time units. In some embodiments, the tracker engine may identify one or more zones on the event graph corresponding to one or more periods of overall risk above a predefined threshold. In some embodiments, each point of the event graph may be navigable to identify entities contributing to an overall risk at the corresponding point. In some embodiments, the tracker engine may provide categories of entities that are identified as threats, and subcategories indicative of risk levels of the threats. In some embodiments, the tracker engine may identify a number of riskiest entities and risk scores of the riskiest entities.

At least one aspect of the present disclosure is directed to a method for risk tracking. A tracker engine executable on one or more servers may provide, in a user interface, a plurality of categories of locations for files in a networked environment. The tracker engine may identify in the user interface risk categories of the files in each of the categories of the locations. The tracker engine may provide, in the user interface, types of egress points for the files. The tracker engine may generate links between the categories of the locations of the files, the risk categories of the files and the types of egress points for the files. Details about each of the files may be navigable from the user interface via a corresponding category of a location of the file, a corresponding risk category of the file or a corresponding type of egress point for the file.

In some embodiments, the plurality of categories of locations may include at least one of: a database, a file-share application, an end-point, or a server cloud. In some embodiments, the risk categories of the files may include at least one of: classified files, at-risk files, or secure files. In some embodiments, the types of egress points of the files may include at least one of: email, removable storage, printer, file copy, file move between locations, or network upload.

In some embodiments, the tracker engine may provide, for each of the types of egress points of the files, a count of the corresponding egress points and a count of events indicative of a threat associated with the corresponding egress points. In some embodiments, the tracker engine may generate an event graph comprising a risk trend graph indicative of an overall risk across entities in the networked environment over a plurality of time units. In some embodiments, the tracker engine may identify one or more zones on the event graph corresponding to one or more periods of overall risk above a predefined threshold. In some embodiments, each point of the event graph may be navigable to identify entities contributing to an overall risk at the corresponding point. In some embodiments, the tracker engine may provide categories of entities that are identified as threats, and subcategories indicative of risk levels of the threats. In some embodiments, the tracker engine may identify a number of riskiest entities and risk scores of the riskiest entities.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

It should be understood that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

FIG. 6E is an illustration of an event details list in an example user interface in a system for risk tracking;

FIG. 7A-7C each is an illustration of an entity list dialog in an example user interface in a system for risk tracking;

The features and advantages of the concepts disclosed herein will become more apparent from the detailed description set forth below when taken in conjunction with the drawings.

DETAILED DESCRIPTION

Following below are more detailed descriptions of various concepts related to, and embodiments of, inventive systems and methods for classifying content to prevent data breach or exfiltration. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Section A describes a network environment and computing environment which may be useful for practicing various computing related embodiments described herein.

Section B describes systems and methods for risk tracking.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

A. Computing and Network Environment

Prior to discussing specific embodiments of the present solution, it may be helpful to describe aspects of the operating environment as well as associated system components (e.g., hardware elements) in connection with the methods and systems described herein.

Figure 1A:
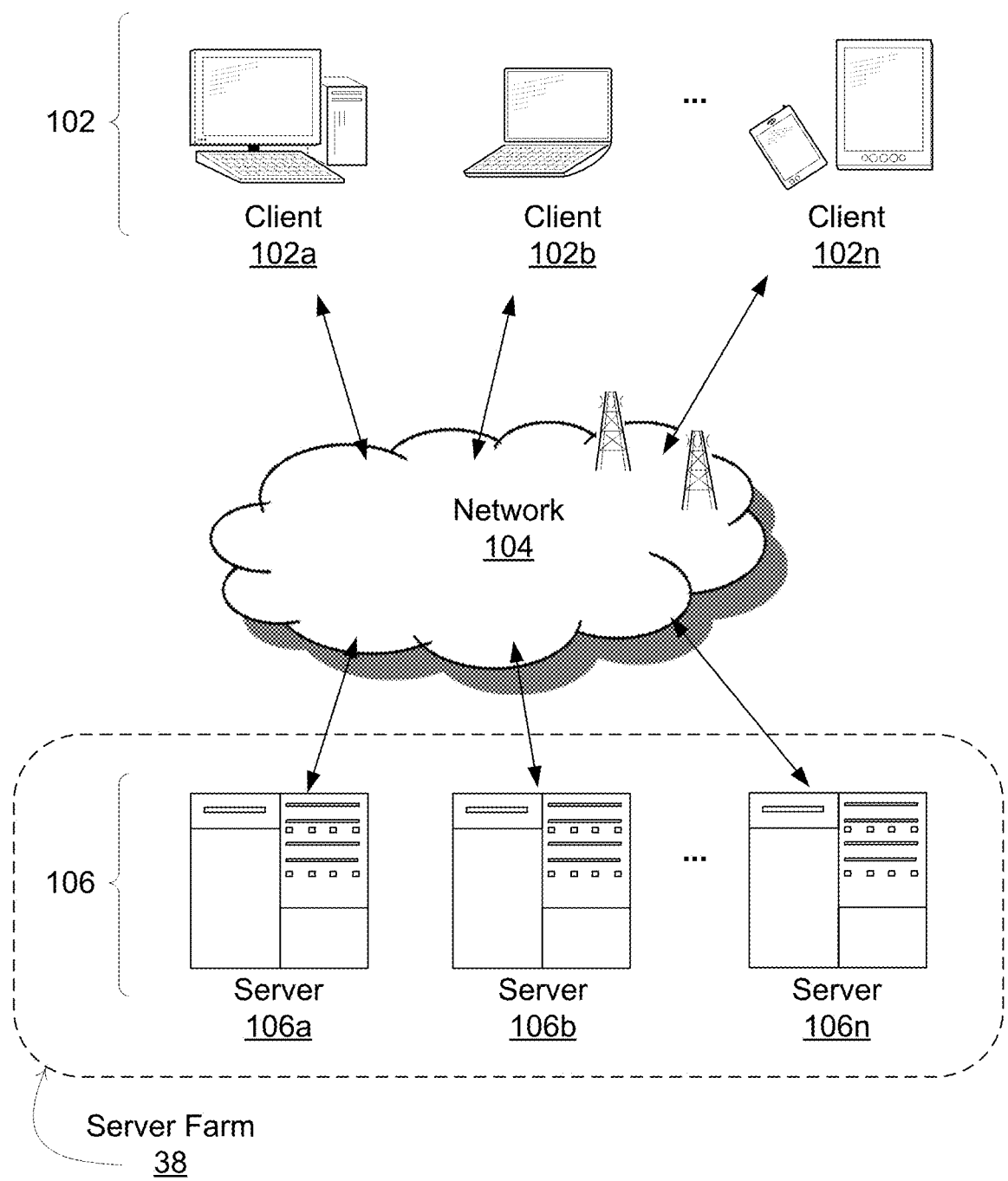
FIG. 1A is a block diagram depicting an embodiment of a network environment comprising client devices in communication with server devices.

Referring to FIG. 1A, an embodiment of a network environment is depicted. In brief overview, the illustrated exploring network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106. The clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, NFC, RFID Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network, which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualized physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes may be in the path between any two communicating servers.

Figure 1B:
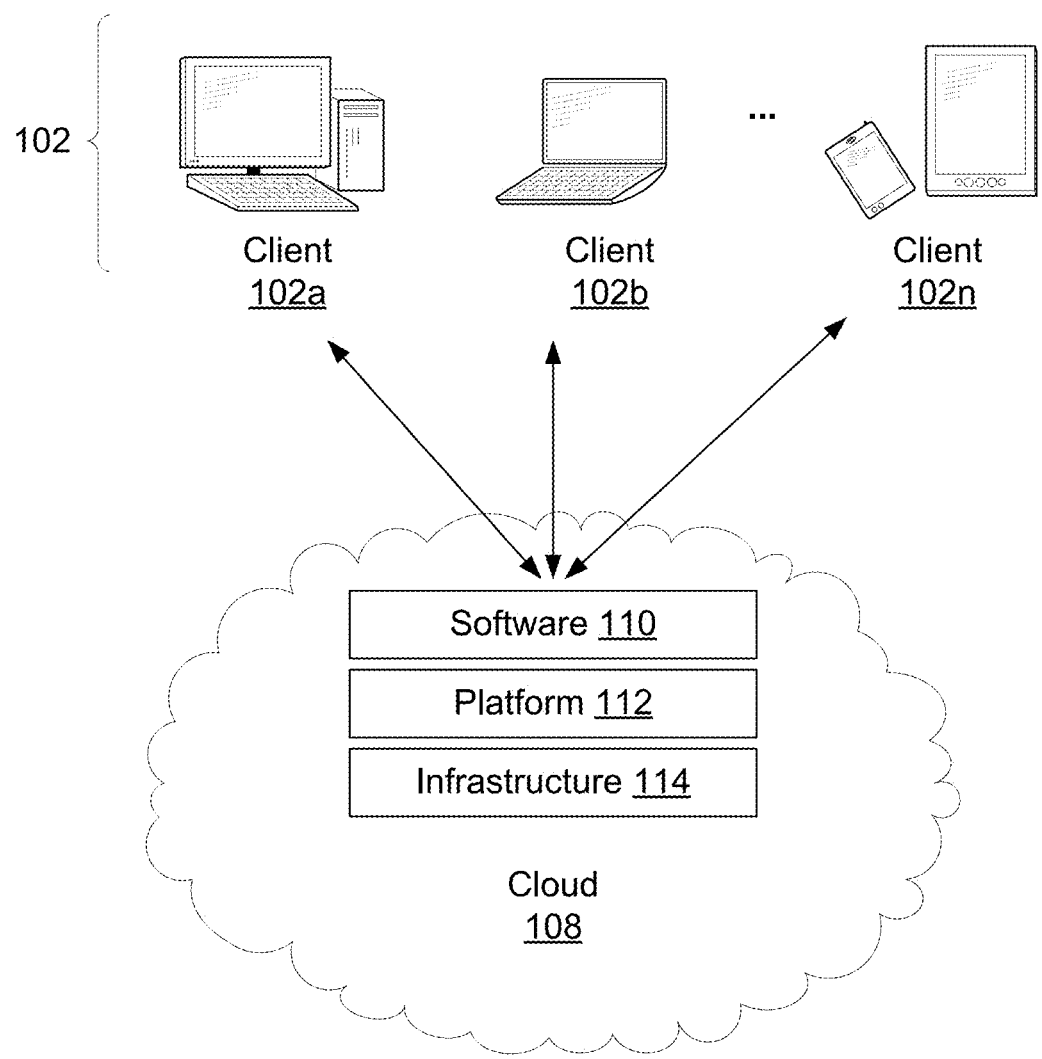
FIG. 1B is a block diagram depicting a cloud computing environment comprising client devices in communication with a cloud service provider.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
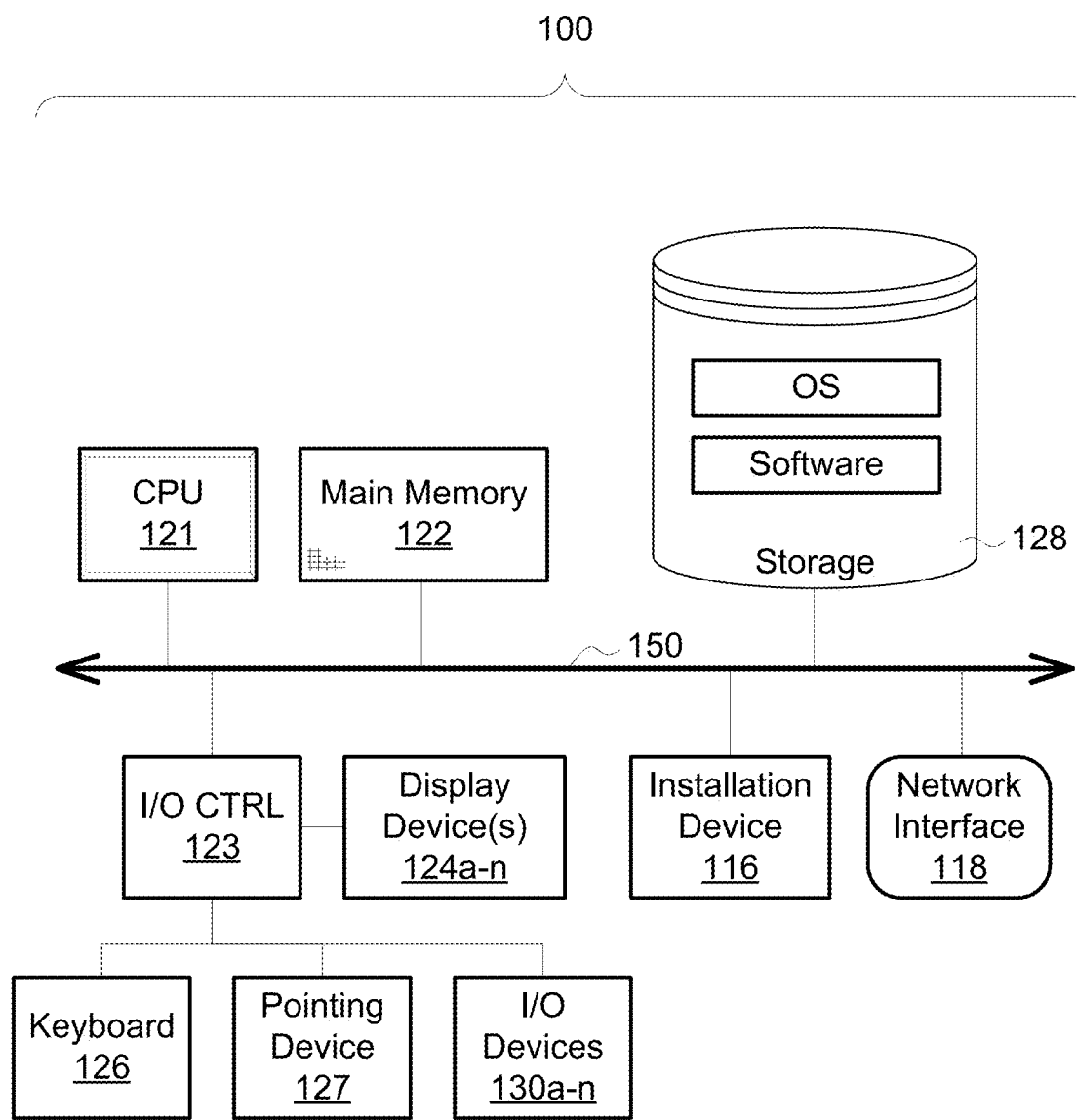
FIGS. 1C and 1D are block diagrams depicting embodiments of computing devices useful in connection with the methods and systems described herein.
Figure 1D:
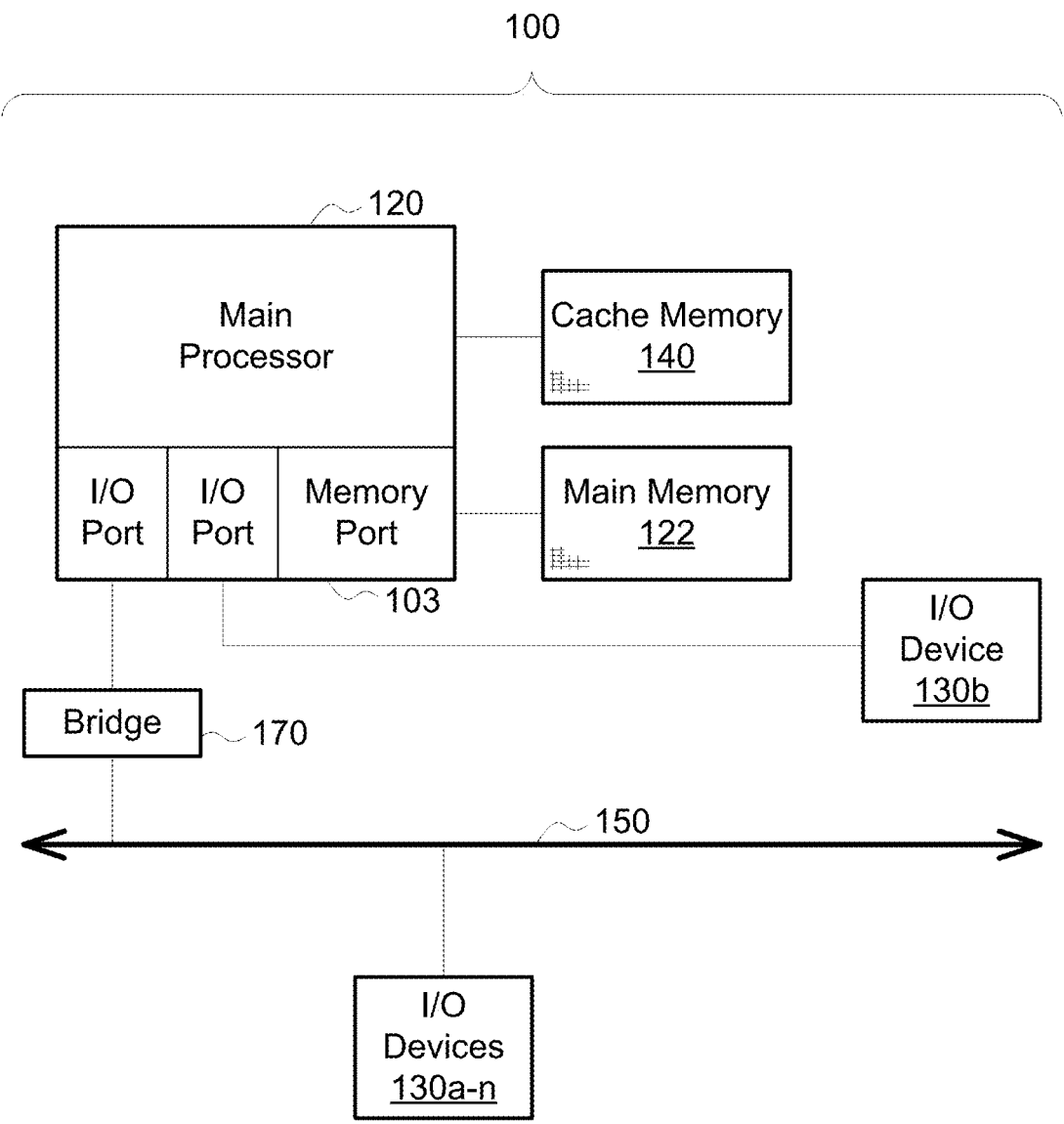

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, and/or software 120. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferro-electric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, B SRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/ AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call. In some embodiments, the communication device 102 is a wearable mobile computing device including but not limited to Google Glass and Samsung Gear.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Risk Tracking

Figure 2:
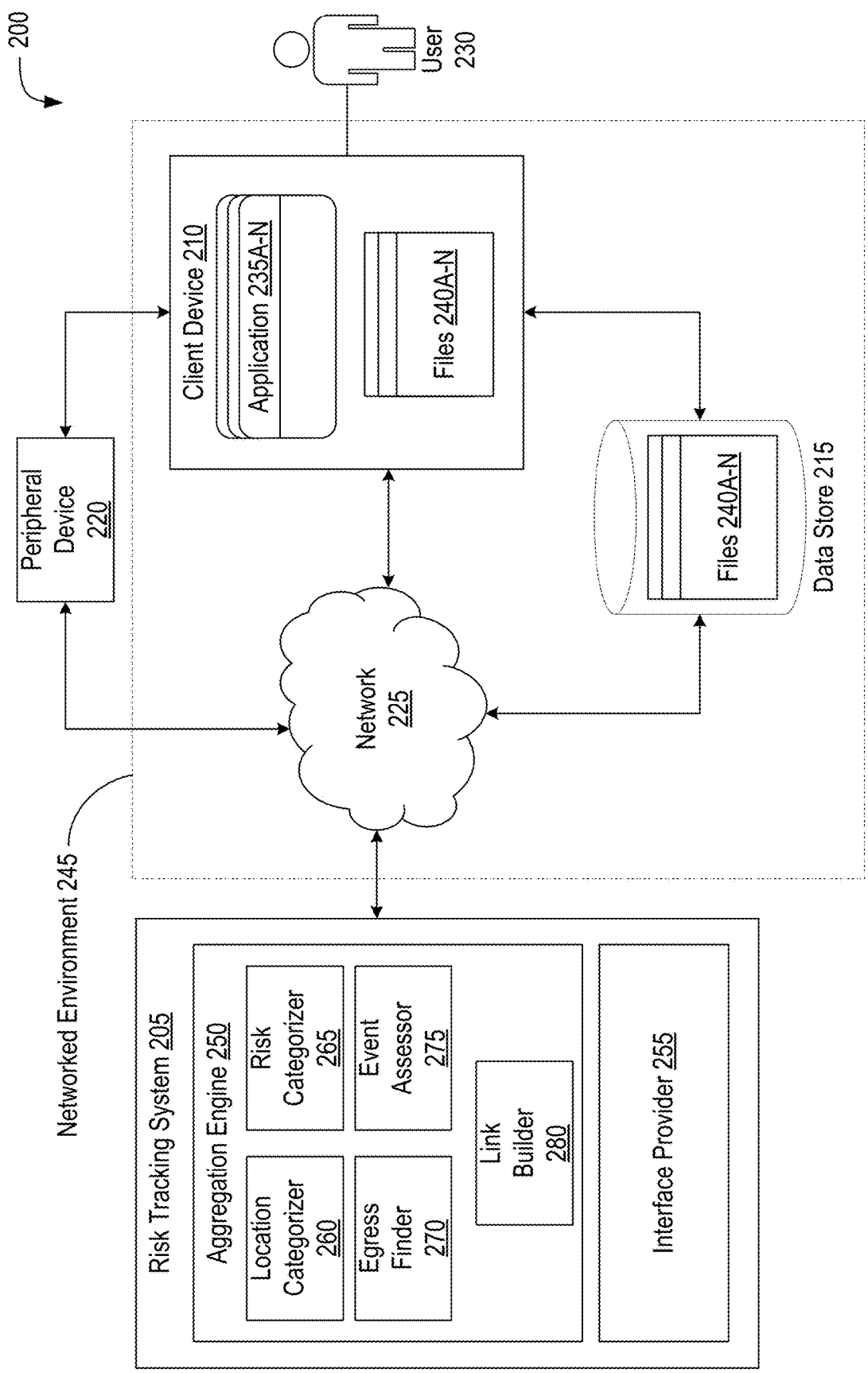
FIG. 2 is a block diagram depicting an example embodiment of a system for risk tracking.

Referring now to FIG. 2, depicted is a block diagram of an embodiment of a system 200 for risk tracking. In brief overview, the system 200 may include at least one tracking system 205, at least one client device 210, at least one data store 215, and at least one periphery device 220. The risk tracking system 205, the client device 210, the data store 215, and/or the peripheral device 220 may be communicatively coupled with one another via at least one network 225. The client device 210 may be operated by at least one user 230 (e.g., via an input/output device connected with the client device 210). The client device 210 may include one or more applications 235a-n (hereinafter generally referred to as application 235) and one or more files 240a-n (hereinafter generally referred to as file 240). The data store 215 may include the files 240. The risk tracking system 205 (sometimes generally referred to as a tracker engine) may include at least one aggregation engine 250 and at least one interface provider 255. The aggregation engine 250 may include at least one location categorizer 260, at least one risk categorizer 265, at least one egress finder 270, at least one event assessor 275, and at least one link builder 280. In some embodiments, the risk tracking system 205 may run or be executed on one or more servers or computing devices communicatively coupled via the network 225. The network 225 may be a private network (e.g., an Intranet or a virtual private network (VPN)) or a public network (e.g., the Internet). The components accessible via the network 225, such as the client device 210, and the data store 215 may be part of or associated with a networked environment 245 (e.g., an enterprise service). In some embodiments, the peripheral device 220 also may be part of or associated with the networked environment 245.

Each of the above-mentioned elements or entities (e.g., the correlation system 205 and its components, the client device 210 and its components, data store 215 and its components, the peripheral device 220 and its components, and the network 225) is implemented in hardware, or a combination of hardware and software, in one or more embodiments. For instance, each of these elements or entities could include any application, program, library, script, task, service, process or any type and form of executable instructions executing on hardware of the system, in one or more embodiments. The hardware includes circuitry such as one or more processors, for example, as described above in connection with FIGS. 1A-1D, in some embodiments, as detailed in section A.

In further detail, the application 235 executing on the client device 210 may access one or more of the files 240 maintained in the networked environment. The network environment 245 may be part of an enterprise service for hosting resources accessed and retrieved by the application 235. In some embodiments, the application 235 may be virtually executed on a remote server and operated via the client device 210 in accessing the files 240 in the networked environment. The application 235 may include any process, a routine, a daemon, a task, or other executable modules. For example, the application 235 may be a word processing application, a spreadsheet application, a presentation program, a web browser, a multimedia player, a video game, or a background process, among others. In some embodiments, the application 235 may be operated by the user 230 via the input/output devices connected to the client device 210. For example, the user 230 may interact with a graphical user interface of the application 235 presented via a display of the client device 210 to operate the application 235. In some embodiments, the operation of the application 235 may be associated with the user 230. For example, to initiate a session of the application 235, the user 230 may enter authentication credentials (e.g., account identifier and passcode) via the client device 210. Once successfully authenticated, the operation of the application 235 may be associated with the user 230 via the account identifier of the authentication credentials.

Each file 240 accessed by the application 235 may be stored and maintained in any location throughout the networked environment. Each file 240 may be a unit of data of any specified format. The file 240 may be, for example, a document, a spreadsheet, a presentation slide, an image file, a multimedia file, and a configuration file, among others. In some embodiments, the file 240 may be stored locally on the client device 210 (e.g., a hard disk drive or memory) as the application 235. In some embodiments, the file 240 may be stored and maintained on the data store 215. The data store 215 may be a storage unit remote from the client device 210. The data store 215 may include: a removable storage unit (e.g., a memory card, an external hard disk drive, or a flash drive), a file sharing service (e.g., a peer-to-peer file sharing service), a cloud service (e.g., a cloud storage application), and an end point (e.g., another client device 210), or any storage remote from the client device 210 accessible via the network 225.

The location of each file 240 may be referenced using a location identifier. The location identifier may include a set of alphanumeric characters (or a string) corresponding to the location of the file 240. The location identifier of the file 240 may be in accordance with a pathname protocol, such as a file system or a uniform resource locator (URL), among others. The location identifier of the file 240 in accordance with a file system may include a host, a drive, a directory (including folder and sub-folders), a base name, and an extension. The location identifier of the file 240 in accordance with URL may include a scheme, a hostname, a path segment (including folder and sub-folders), and filename. Each portion of the location identifier in either the file system or URL may be separated by a divider (e.g., ":", "/", "//", "\", or "@"). In some embodiments, the file 240 or the location at which the file 240 is stored may be encrypted using a cryptographic algorithm. The cryptographic algorithm applied onto the file 240 or the location may include asymmetric cryptography (e.g., public-key cryptography) or symmetric cryptography (e.g., stream cipher or block cipher). The cryptographic algorithm applied onto the file 240 or the location of the file 240 may be in accordance to a level of encryption. The level of encryption may indicate a computational complexity of the cryptographic algorithm applied to the file 240, and may range from low, medium, to high. In some embodiments, the file 240 or the location at which the file 240 is stored may be subject to an access control (sometimes referred to as a permission or access right). For example, the file 240 or the location at which the file 240 is stored may be designated as readable, writable, and/or executable, among other specifications. In some embodiments, the file 240 or the location in which the file 240 is stored may be subject to an information management system (IMS) controls, such as Active Directory Rights Managements Services (ADRMS). The IMS controls may be specified by the networked environment 245. The IMS controls may specify whether a file copy operation or a file move operation is permissible for the file 240.

In accessing the one or more files 240, the application 235 may apply any number of operations to the file 240. In some embodiments, the operation to be applied by the application 235 onto the file 240 may be specified by the user 230 operating the application 235 via the input/output devices of the client device 210. For example, the application 235 may open the file 240 to access and retrieve the contents. The application 235 may edit the contents of the file 240 by adding, removing, or replacing the content. The application 235 may copy the file 240 onto another location in the network environment 245 (e.g., locally onto the client device 210 or to the data store 215) or outside the network environment 245 (e.g., via email). The application 235 may transfer (e.g., cut and paste) the file 240 onto another location in the network environment 245 (e.g., locally onto the client device 210 or to the data store 215) or outside the networked environment. The application 235 may delete the file 240 from the networked environment. The application 235 may output at least a portion of the contents of the file 240 via the periphery device 220. The peripheral device 220 may include any devices or components to output the contents of the file 240 in a physical medium. The peripheral device 220 may include, for example, a display to visually present the contents of the file 240, a printer to print the contents of the file 240 onto paper or into a three-dimensional medium, or a loudspeaker to play the audio content of the file 240, among other devices.

In some embodiments, the attempts to access the one or more files 240 in may be recorded on a log file for the networked environment 245. For example, an enterprise server providing resources for the networked environment 245 may maintain the log file and keep track of the operations performed on the files 240. The log file may include: a type of operation on the file 240; the location identifier for the file 240; an entity (e.g., the client 210, the application 235, or the user 230) associated with the operation on the file 210; and/or a timestamp corresponding to a time at which the operation occurred, among others.

Each attempt at accessing the files 240 in the network environment 245 may present a multitude of potential security risks to the data contained in the files 240. The data themselves in the files 240 may be sensitive or classified. The user 230 of the client device 210 may also unwittingly or intentionally increase security threats to the data of the files 240 in the networked environment 245 by accessing the file 240. For example, the user 230 may attempt to extract sensitive data from the files 240 via the peripheral device 220 (e.g., by printing or displaying). Frequent transferal of the files 240 from one location to another location (e.g., the client device 210 or the data store 215) may also render the data contained in the files 240 vulnerable to security threats. For example, malicious parties may attempt to intercept the data, as the files 240 are moved from one location to the other within the networked environment 245. The risk tracking system 205 may identify these potential security risks for presentation in a graphical user interface to aid in the diagnosis and prevention of such threats.

The location categorizer 260 of the aggregation engine 250 executing on the risk tracking system 205 may identify a set of categories of locations for the files 240 in the networked environment. The categories of locations may include, for example, a database, a file sharing service, a cloud service, or an end point, among others. In some embodiments, the location categorizer 260 may traverse the files 240 in identifying the category of location for each file 240 in the networked environment. In some embodiments, the location categorizer 260 may identify the category of location for the file 240 based on the location identifier for each file 240. The location categorizer 260 may parse the location identifier for each file 240 to identify one or more subset strings of the location identifier. Each subset string may include a portion of the alphanumeric characters forming the location identifier for the file 240. When the location identifier is in accordance with a file system, the subset strings parsed from the location identifier may include the host, the drive, the folder, the subfolders, the file name, and the extension. When the location identifier is in accordance with URL, the subset strings parsed from the location identifier may include the scheme, the protocol, the hostname, the path segment, and the file name.

With the identification of the subset strings from the location identifier for the file 240, the location categorizer 260 may compare against a list of strings for the categories of locations. The list of strings may map or correlate strings to at least one of the categories of locations. For example, the list of strings may include a set of hosts, drives, or hostnames for file sharing services, cloud services, databases, or end points. In some embodiments, the location categorizer 260 may compare the subset string corresponding to the host, drive, or the hostname to the list of strings for the categories of locations. When the subset string of the location identifier is determined to match the list of strings for file sharing services, the location categorizer 260 may classify the category of location for the file 240 as a file sharing service. When the subset string of the location identifier is determined to match the list of strings for cloud services, the location categorizer 260 may classify the category of location for the file 240 as a cloud service. When the subset string of the location identifier is determined to match the list of strings for database, the location categorizer 260 may classify the category of location for the file 240 as a database. When the subset string of the location identifier is determined to match the list of strings for endpoints, the location categorizer 260 may classify the category of location for the file 240 as an endpoint. In some embodiments, the location categorizer 260 may identify the pathname protocol of the location identifier for the file 240. Based on the pathname protocol, the location categorizer 260 may classify the category of location for the file 240.

The risk categorizer 265 of the aggregation engine 250 executing on the risk tracking system 205 may identify at least one risk category of the files 240 in each of the categories of locations. The risk category may indicate a classification of sensitivity in the data contained in the files 240. The risk category for the file 240 may include one or more of a classified file, an at-risk file, or a secure file, among others. In some embodiments, the risk category for the file 240 identified by the risk categorizer 265 may also include an intrinsic risk potential for the file 240. The intrinsic risk potential may indicate a degree of potential risk to the data contained with file 240 to security threats (e.g., interception, exfiltration, and other malicious behavior). The degree of potential risk may be enumerated using a numerical value (e.g., a real number between 0 and 1) or a set of alphanumeric characters corresponding a set risk designation (e.g., "low," "medium," or "high"). For example, the risk category may indicate one file 240 as "high risk", another file 240 as "medium risk," and another file 240 as "low risk."

The risk categorizer 265 may classify each file 240 in each category of location into at least one of the categories of risk based on any number of factors. The factors may include, for example, the contents of the file 240, the category of location for the file 240, the encryption of the file 240, and the access control of the file 240, among others, or any combination thereof. In some embodiments, the risk categorizer 265 may identify the risk category for the file 240 based on the category of location for the file 240. The risk categorizer 265 may compare the category of location for the file 240 to a list of risk categories for locations. The list of risk categories may define the risk category for the file 240 for each category of location. For example, the list may define that files 240 in file share services as at-risk files and files 240 in cloud services as secure files. In some embodiments, the list of risk categories may also specify the degree of potential risk to the file 240 for the category of location of the file 240. The risk categorizer 265 may identify the risk category for the category of location of the file 240 in the list of risk categories. Based on the identification, the risk categorizer 265 may classify the file 240 into one or more of the risk categories.

In some embodiments, the risk categorizer 265 may identify the risk category for the 240 based on the contents of the file 240. The risk categorizer 265 may parse the file 240 to identify the contents of the file 240. The contents of the file 240 may include sensitive information, such as financial information, health records, and personal data, among others. The risk categorizer 265 may apply a natural language processing algorithm to the contents of the file 240 to determine whether the content of the file 240 includes sensitive information. The natural language processing algorithm may include semantic analysis, entity recognition, segmentation, or topic recognition, among others. When the content of the file 240 is determined to include sensitive information, the risk categorizer 265 may identify the risk category for the file 240 as a classified file. On the other hand, when the content of the file 240 is determined not to include any sensitive information, the risk categorizer 265 may identify the risk category for the file 240 based on other factors.

In some embodiments, the risk categorizer 265 may identify the risk category for the file 240 based on the encryption applied to the file 240 or the location in which the file 240 is stored. The risk categorizer 265 may identify the cryptographic algorithm applied to each file 240 in the networked environment 245. In identifying the cryptographic algorithm, the risk categorizer 265 may identify metadata associated with the file 240 (or the location in which the file 240 is stored). The metadata associated with the file 240 may indicate whether the file 240 is encrypted and/or the cryptographic algorithm applied to the file 240. In some embodiments, the metadata associated with the file 240 may indicate a level of encryption for the file 240. The risk categorizer 265 may parse the metadata to determine whether encryption is applied to the file 240. In addition, the risk categorizer 265 may identify the cryptographic algorithm applied to the file 240. In some embodiments, the risk categorizer 265 may parse the metadata to identify the level of encryption of the cryptographic algorithm applied to the file 240.

Based on the identifications, the risk categorizer 265 may classify the file 240 into one or more of the risk categories. If the file 240 is determined to not have any encryption, the risk categorizer 265 may identify the risk category for the file 240 as an at-risk file. On the other hand, if the file 240 is determined to be encrypted, the risk categorizer 265 may identify the file 240 as a secure file. In some embodiments, the risk categorizer 265 may identify the risk category for the file 240 based on the cryptographic algorithm applied to the file 240. The risk categorizer 265 may compare the cryptographic algorithm to a list of risk categories for encryption. The list of risk categories may define the risk category for each cryptographic algorithm applied to the file 240. For example, the list may define the risk category for more computationally complex cryptographic algorithms as "low risk," whereas the risk category for less computationally complex cryptographic algorithms as "medium" or "high risk." The risk categorizer 265 may identify the risk category for the cryptographic algorithm applied to the file 240 from the list of risk categories. Based on the identification, the risk categorizer 265 may classify the file 240 into one or more of the risk categories. In some embodiments, the risk categorizer 265 may identify the risk category for the file 240 based on the level of encryption for the cryptographic algorithm applied on the file 240. For example, the risk categorizer 265 may classify the risk category for the file 240 as "low risk," when the level of encryption is denoted as high. In contrast, the risk categorizer 265 may classify the risk category for the file 240 as "high risk," when the level of encryption is denoted as low.

In some embodiments, the risk categorizer 265 may identify the risk category for the file 240 based on the access control of the file 240 or the location in which the file 240 is located. The risk categorizer 265 may identify the access control of the file 240 from metadata associated with the file 240. The risk categorizer 265 may also identify the access control of the file 240 from the metadata associated with the location in which the file 240 is stored. The metadata in either case may specify the access control applicable to the file 240 (e.g., readable, writable, or executable). The risk categorizer 265 may compare the access control specifications of the file 240 to a list of risk categories for access control. The list of risk categories may map access control specifications to one or more risk categories. Certain access control specifications may be more susceptible to security threats. For example, the list may define that a file 240 with readable and writable control access specifications may have a risk category of an at-risk file, whereas a file 240 with non-writable control access specification may have a risk category of a secure file. The risk categorizer 265 may identify the risk category for the access control specifications of the file 240 from the list of risk categories. Based on the identification, the risk categorizer 265 may classify the file 240 into one or more of the risk categories.

The egress finder 270 of the aggregation engine 250 executing on the risk tracking system 205 may identify one or more types of egress points for each file 240. The types of egress points may include operations (e.g., file operations), locations, or other media through which the file 240 may be transferred within or from the networked environment 245. The types of egress points may include, for example, an electronic mail, removable storage, the peripheral device 220 (e.g., a printer, a display, or a loudspeaker), a file copy operation, a file move operation, or a network upload, among others. For each file 240, the egress finder 270 may determine whether each type of egress point is permissible for the file 240. In some embodiments, the egress finder 270 may determine or identify a number of the egress points permissible for the file 240. The number of egress points may be kept track by the egress finder 270 using a counter.

In some embodiments, the egress finder 270 may determine whether the file 240 can be attached to an electronic mail. The egress finder 270 may compare a size of the file 240 to an attachment limit to electronic mail. If the size of the file 240 is greater than or equal to the limit, the egress finder 270 may determine that electronic mail is a potential egress point for the file 240. On the other hand, if the size of the file 240 is less than the limit, the egress finder 270 may determine that electronic mail is not a potential egress point for the file 240. In some embodiments, the egress finder 270 may determine whether the location in which the file 240 is located is a removable storage. For example, the file 240 may be on a memory card, an external hard disk drive, or a flash drive communicatively connected with the client device 210. The egress finder 270 may identify the location identifier for the file 240. The egress finder 270 may parse the location identifier for the file 240 to identify the drive. The egress finder 270 may also access drive letter assignments of the client 210. The drive letter assignments may specify which are for removable storages. The egress finder 270 may compare the drive identified from the location identifier for the file 240 against the drive letter assignments for the client 210. If the drive of the location identifier matches the drive letter assignment for removable storages, the egress finder 270 may determine that the removable storage is a potential egress point for the file 240. In some embodiments, the egress finder 270 may also increment a number of potential egress points for file 240. Otherwise, if the driver of the location identifier does not match the drive letter assignment for removable storage units, the egress finder 270 may determine that the removable storage is not a potential egress point for the file 240.

In some embodiments, the egress finder 270 may determine whether the peripheral device 220 is a potential egress point for the file 240. The egress finder 270 may determine whether the client 210 accessing the file 240 is communicatively coupled with the peripheral device 220. In some embodiments, the egress finder 270 may access a device manager of the client 210 to identify one or more peripheral devices 220 communicatively coupled with the client 210. When the client 210 is determined to be communicatively coupled with the peripheral device 220, the egress finder 270 may determine that the peripheral device 220 is a potential egress point for the file 240. In addition, the egress finder 270 may identify a type of the peripheral device 220. The type may include one or more of a printer, a display, or a loudspeaker, among others. In some embodiments, the egress finder 270 may also increment a number of potential egress points for file 240. Conversely, when the client 210 is determined to be not communicatively coupled with the peripheral device 220, the egress finder 270 may determine that the peripheral device 220 is not a potential egress point for the file 240.

In some embodiments, the egress finder 270 may determine whether a file copy operation is a potential egress point for the file 240. The file copy operation may involve a replication of the file 240 in another location within the networked environment 245. Whether the file copy operation is permitted for the file 240 may be specified in metadata for the file 240 or the information management system (IMS) for the networked environment 245. In some embodiments, the egress finder 270 may identify the metadata for the file 240. The egress finder 270 may parse the metadata for the file 240 to identify whether the file copy operation is permitted for the file 240. In some embodiments, the egress finder 270 may access the IMS for the networked environment 245. The IMS may specify whether the file copy operation is permitted for the file 240. By accessing the IMS, the egress finder 270 may identify whether the file copy operation is permitted for the file 240. If the corresponding metadata or the IMS specifies that the file copy operation is permitted, the egress finder 270 may determine that the file copy operation is a potential egress point for the file 240. In some embodiments, the egress finder 270 may also increment a number of potential egress points for file 240. On the other hand, if the corresponding metadata or IMS specifies that the file copy operation is not permitted, the egress finder 270 may determine that the file copy operation is not a potential egress point for the file 240.

In some embodiments, the egress finder 270 may determine whether a file move operation is a potential egress point for the file 240. The file move operation may involve a replication of the file 240 in another location within the networked environment 245. Whether the file move operation is permitted for the file 240 may be specified in metadata for the file 240 or the information management system (IMS) for the networked environment 245. In some embodiments, the egress finder 270 may identify the metadata for the file 240. The egress finder 270 may parse the metadata for the file 240 to identify whether the file move operation is permitted for the file 240. In some embodiments, the egress finder 270 may access the IMS for the networked environment 245. The IMS may specify whether the file move operation is permitted for the file 240. By accessing the IMS, the egress finder 270 may identify whether the file move operation is permitted for the file 240. If the corresponding metadata or the IMS specifies that the file move operation is permitted, the egress finder 270 may determine that the file move operation is a potential egress point for the file 240. In some embodiments, the egress finder 270 may also increment a number of potential egress points for file 240. On the other hand, if the corresponding metadata or IMS specifies that the file move operation is not permitted, the egress finder 270 may determine that the file move operation is not a potential egress point for the file 240.

In some embodiments, the egress finder 270 may determine whether network upload is a potential egress point for the file 240. A network upload may include uploading or copying the file 240 to another location outside the networked environment 245, such as an external network. In determining whether network upload is a potential egress point, the egress finder 270 may determine whether the location in which the file 240 is stored is communicatively coupled with another network besides the networked environment 240. For example, the client device 210 with the files 240 may be connected to another network outside the network 225 of the networked environment 245, potentially opening up the possibility that the file 240 is transferred to the outside network. If the location in which the file 240 is stored is communicatively coupled with the external network, the egress finder 270 may determine that network upload is a potential egress point for the file 240. In some embodiments, the egress finder 270 may also increment a number of potential egress points for file 240. Otherwise, if the location in which the file 240 is stored is not communicatively coupled with the external network, the egress finder 270 may determine that network upload is not a potential egress point for the file 240.

The event assessor 275 of the aggregation engine 250 executing on the risk tracking system 205 may identify one or more events occurring in the networked environment 245. The one or more events may include operations to access the files 240 maintained in the networked environment 245. As discussed above, the operations to the files 240 may include opening the file 240, editing the contents of the file 240 (e.g., adding, removing, or replacing), copying the file 240, moving the file 240, deleting the file 240, and outputting contents of the file 240 (e.g., via the peripheral device 220). In some embodiments, the event assessor 275 may monitor for one or more events invoked by applications 235 executing on the client device 210 occurring in the networked environments 245. Upon detection of each event, the event assessor 275 may identify: a type of operation on the file 240; the location identifier for the file 240; an entity (e.g., the client 210, the application 235, or the user 230) associated with the operation on the file 210; and a timestamp corresponding to a time at which the operation occurred, among others. In some embodiments, the event assessor 275 may keep track of the events detected in the networked environment 245. In some embodiments, the event assessor 275 may access the log file maintained by the networked environment 245. The log file may include the operations performed on the file 240 of the networked environment 245.

For each event including operations to access one or more of the files 240, the event assessor 275 may calculate or determine a risk score of the event to the networked environment 245. The risk score may indicate a degree to which the file 240 may become vulnerable to security threats (e.g., interception, exfiltration, and other malicious behavior) as a result of the operation performed on the file 240. The degree of potential risk may be enumerated using a numerical value (e.g., a real number between 0 and 100) or a set of alphanumeric characters corresponding a set risk designation. The event assessor 275 may determine the risk score of the event based on any number of factors. The factors may include: the location category in which the file 240 is located, the risk category for the file 240, the intrinsic risk potential for the file 240, potential egress point types for the file 240, a number of potential egress points for the file 240, and/or the type of operation applied to the file 240, among others. In some embodiments, the event assessor 275 may apply the factors to a risk evaluator function in determining the risk score. The risk evaluator function may map or correlate the factors to a risk level. For example, the risk evaluator function may assign a risk score corresponding to "high risk" (e.g., 66 to 100) to the location category of endpoint, the risk category of an at-risk file with sensitive information, all egress points as potential, and the type of operation as a file move operation. In contrast, the risk evaluator function may assign a risk score corresponding to "low risk" (e.g., 0 to 33) the location category of cloud service, the risk category of a secure file with sensitive information, two potential egress points, and the type of operation as opening the file 240. By applying the factors to the risk evaluator function, the event assessor 275 may determine the risk score of the event to access the file 240 in the networked environment 245. In some embodiments, the event assessor 275 may compare the risk score to a threshold score. The threshold score may correspond to a score at which to flag the network administrator of the risk tracking system 205.

In some embodiments, a delineation among "low risk," "medium risk," and "high risk" among the risk scores may be set by the network administrator. For example, the delineation may be defined using the following query attribute definitions:

```
{
    "field": "dg_file_size",
    "aggregate": "range",
    "ranges" : {
        "small" : {
            "from" : 0,
            "to" : 12000
        },
        "medium" : {
            "from" : 12000,
            "to" : 18000
        },
        "large" : {
            "from" : 18000,
            "to" : 60000
        },
        "say what now?" : {
            "from" : 60000,
            "to" : 1000000000
        }
    }
},
{
```

-continued

```
"fields": [
    {
        "type": "string",
        "array": false,
        "name": "pi_in",
        "tags": [ ]
    },
    {
        "type": "long",
        "array": false,
        "name": "dg_file_size",
        "tags": [ ]
    },
    {
        "type": "int",
        "array": false,
        "name": "*",
        "tags": [ ]
    }
],
"data": [
    [
        "badFile7.exe"
        "medium",
        9
    ],
    [
        "badFile6.exe"
        "medium",
        7
    ],
    [
        "badFile5.exe"
        "large",
        5
    ]
]
}
```

In some embodiments, the event assessor 275 may calculate or determine a change in the risk score in a set time period. The set time period may range between a minute to weeks, among others. To determine a change in the risk score, the event assessor 275 may identify a risk score at a time instance and another risk score at another time instance that is at least the set time period away (e.g., in the past). In some embodiments, the event assessor 275 may identify the highest risk score and the lowest risk score within the set time period. The event assessor 275 may calculate a difference between the two risk scores to determine the change in the risk score. In some embodiments, the event assessor 275 may determine whether the difference is an increase or a decrease in risk score.

The link builder 280 of the tracking engine 245 executing on the risk tracking system 205 may generate or associate a link between the categories of the locations of the files 240, the risk categories of the files 240, and the types of egress point for the files 240. Each link may be represented as a data structure to amalgamate, connect, relate, or otherwise associate the categories of the locations of the files 240, the risk categories of the files 240, and the types of egress point for the files 240. The data structure of the link may include, for example, an array, a matrix, a heap, a linked list, and a binary tree, among others. In some embodiments, the link may be further with the file 240, the location identifier for the file 240, or the location in which the file 240 is stored. In some embodiments, the link may be further with the intrinsic risk potentials of the files 240. In some embodiments, the link may be further with the number of potential egress point types for the files 240. In some embodiments, the link may be further with the one or more events in accessing the files 240, including: the type of operation on the file 240, the location identifier for the file 240, the entity (e.g., the client 210, the application 235, or the user 230) associated with the operation on the file 210, and a timestamp corresponding to a time at which the operation to the file 240 occurred, among others.

The link may be indexed by any number of parameters, such as the file 240 itself, the categories of the location, the risk categories, or the types of egress points, among other parameters. In some embodiments, the link builder 280 may generate or associate the link for each file 240. The link for the file 240 may include the identified category of location in which the file 240 is stored, the risk category identified for the file 240, and the types of egress points for the file 240. In some embodiments, the link for the file 240 may also include one or more of: the location identifier for the file 240, the location in which the file 240 is stored, the intrinsic risk potential of the file 240, the number of potential egress point types for the file 240, and the one or more events in accessing the file 240. In some embodiments, the link builder 280 may generate or associate the link for each category of location. The link for the category of location may include the files 240 stored in the category of location, the risk categories identified for the files 240 stored in the category of location, the types of egress points for the files 240 stored in the category of location, among others. In some embodiments, the link for the category of location may also include one or more of: the location identifier for the file 240, the location in which the file 240 is stored, the intrinsic risk potential of the file 240, the number of potential egress point types for the file 240, and the one or more events in accessing the file 240.

In some embodiments, the link builder 280 may generate or associate the link for each risk category. The link for the risk category may include the files 240 identified as having the risk category, the categories of location identified for the files 240 with the risk category, the types of egress points for the files 240 with the risk category, among others. In some embodiments, the link for the category of location may also include one or more of: the location identifier for the file 240, the location in which the file 240 is stored, the intrinsic risk potential of the file 240, the number of potential egress point types for the file 240, and the one or more events in accessing the file 240. In some embodiments, the link builder 280 may generate or associate the link for egress point type. The link for the egress point type may include the files 240 identified as having the egress point type, the risk categories identified for the files 240 with the egress point type, and the categories of location identified for the files 240 with the egress point type, among others. In some embodiments, the link for the category of location may also include one or more of: the location identifier for the file 240, the location in which the file 240 is stored, the intrinsic risk potential of the file 240, and the one or more events in accessing the file 240.

Figure 3:
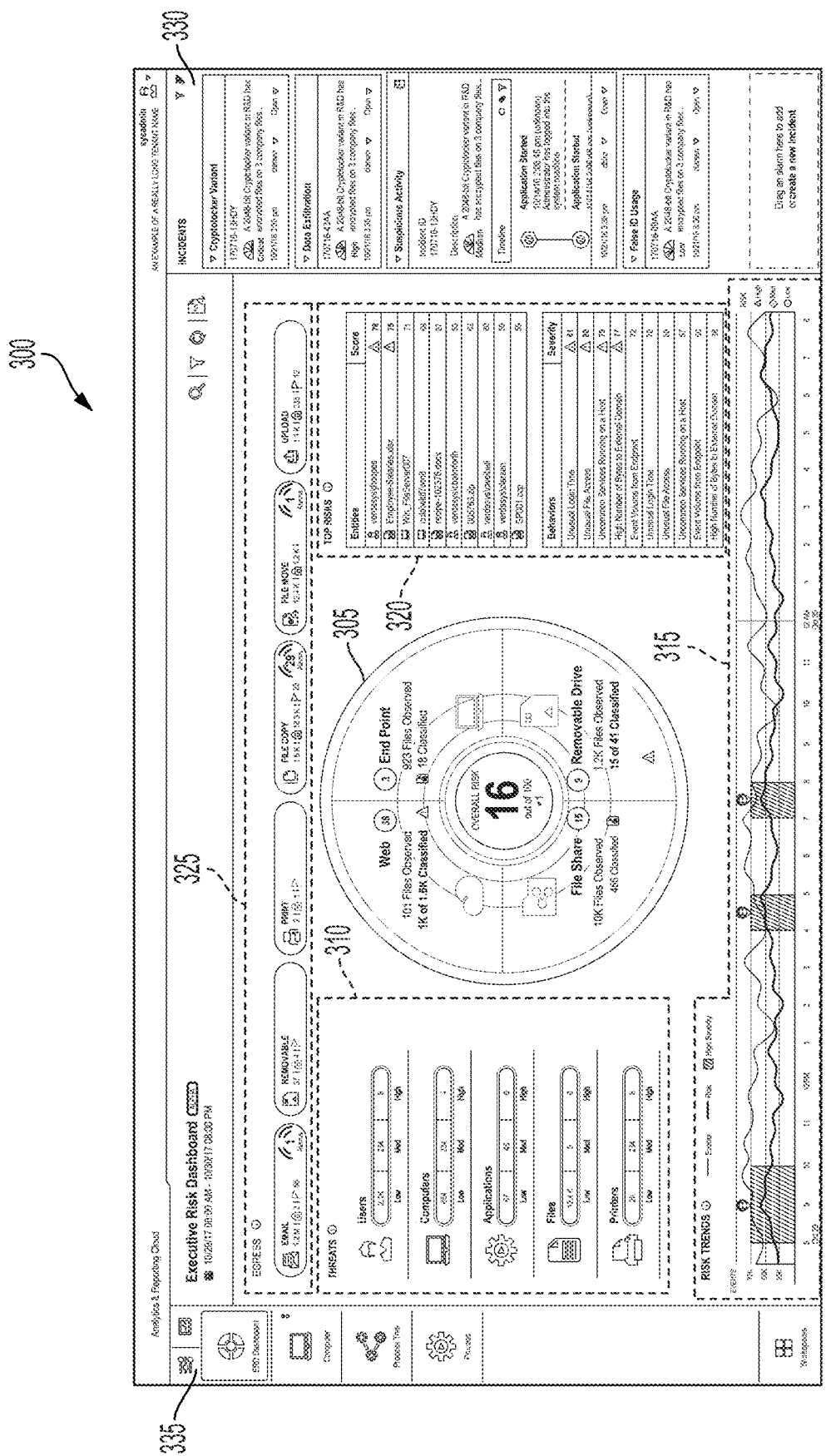
FIG. 3 is an illustration of an example user interface in a system for risk tracking.

Referring now to FIG. 3, depicted is an illustration a user interface 300 in the system 200 for risk tracking. In the context of FIG. 2, the interface provider 245 executing on the risk tracking system 205 may generate the user interface 300 for presentation on a computing device, such as the risk tracking system 205, the client device 210, an administrator computing device for the networked environment 245, or another computing device. The interface provider 245 may use one or more outputs from the aggregation engine 250 (e.g., the categories of locations, categories of risk, and the types of egress points for the files 240 in the networked environment 245) in generating the user interface 300. In the user interface 300, the interface provider 245 may generate or provide the links between the categories of locations of the files 240, the risk categories of the files 240, and the types of potential egress points for the files 240, among others. In some embodiments, the interface provider 245 may generate or provide the links with the one or more events in accessing the files 240, including: the type of operation on the file 240, the location identifier for the file 240, the entity (e.g., the client 210, the application 235, or the user 230) associated with the operation on the file 210, and a timestamp corresponding to a time at which the operation to the file 240 occurred, among others. From the user interface 300, details of each file 240 may be navigable via a corresponding category of location of the file 240, a corresponding risk category of the file 240, and a corresponding type of egress point for the file 240. In some embodiments, details of each file 240 may be navigable via the one or more events in accessing the file 240, such as the type of operation on the file 240, the location identifier for the file 240, the entity associated with the operation on the file 210, and/or a timestamp corresponding to a time at which the operation to the file 240 occurred, among others. In brief overview, the user interface 300 may include at least one data ring 305, at least one threats list 310, at least one risk trend graph 315, at least one risky entities list 320, at least one egress points list 325, at least one incidents list 330, and at least one navigation sidebar 335, among others. The navigation sidebar 355 may be used to access various elements (e.g., the data ring 305, the threats list 310, the risk trend graph 315, the risky entities list 320, and the egress points list 325) of the user interface 300.

Figure 4:
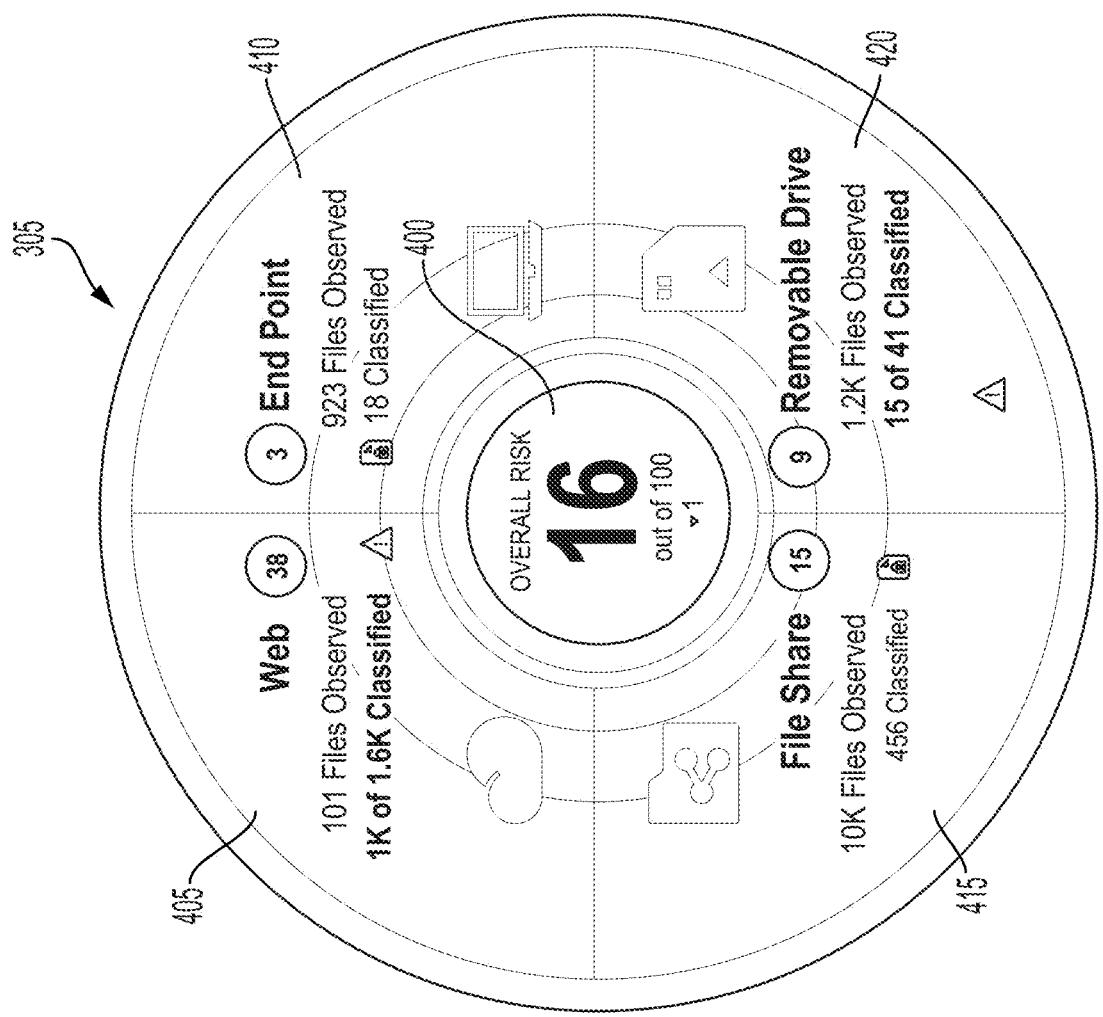
FIG. 4 is an illustration of a data ring of an example user interface in a system for risk tracking.

Referring now to FIG. 4, depicted is an illustration of the data ring 305 of the user interface 300 in the system 200 for risk tracking. In the user interface 300, the data ring 305 may occupy approximately 25-50% of the viewport. The data ring 305 may be located anywhere within the viewport of the user interface 300. For example, as depicted, the data ring 305 may be situated between the threats list 310 and the risky entities list 320 within the user interface 300. The data ring 305 may be of any shape, such as a triangle, a rectangle, a pentagon, a hexagon, a nonagon, an ellipse, a circle (e.g., as depicted), among others. The data ring 305 generated by the interface provider 245 may include at least an overall risk indicator 400, a web risk indicator 405, at least one endpoint risk indicator 410, at least one file share risk indicator 415, at least one removable drive risk indicator 420, among other graphical user elements. The overall risk indicator 400, the web risk indicator 405, the endpoint risk indicator 410, the file share risk indicator 415, and the removable risk indicator 420 may be arranged to be visible in the viewport of the user interface 300 (e.g., as depicted).

The overall risk indicator 400 may present, display, or otherwise include an overall risk score. The overall risk score may be for the networked environment 245. The overall risk score may be determined by the risk categorizer 265 and the event assessor 575, and may indicate an average potential that the files 240 of the networked environment 245 may be vulnerable to security threats (e.g., interception, exfiltration, and other malicious behavior). In some embodiments, the overall risk score may be based on a set previous time rate (e.g., past 24 hours). The overall risk score may be enumerated using a numeral value (e.g., a real number between 0 and 100 as depicted) or a set of alphanumeric characters. In some embodiments, the overall risk indicator 400 may include the change in overall risk score in the set time period. The change in overall risk may be a difference between the highest and lowest risk scores within the set time period. For example, the change may be indicated on the overall risk indicator 400 with the letter delta (Δ). If the difference is null, the overall risk indicator 400 may display "–" and present a tooltip display of "No change in Risk Score from the previous Time Range." If the difference indicates that the overall risk score has increased, the overall risk indicator 400 may present a tooltip display of "Increase of X to Risk Score from previous Time Range." If the difference indicates that the overall risk score has decreased, the overall risk indicator 400 may present a tooltip display of "Decrease of X to Risk Score from previous Time Range."

The web risk indicator 405 may present, display, or otherwise include a summary information of the security threats to the files 240 classified as stored on an Internet location accessible via the networked environment 245. In some embodiments, the web risk indicator 405 may include a number of files 240 analyzed by the aggregation engine 250. In some embodiments, the web risk indicator 405 may include an amount of data in the files 240 that is determined to contain classified or sensitive information. The endpoint risk indicator 410 may present, display, or otherwise include may present, display, or otherwise include a summary information of the security threats to the files 240 stored on the client device 210 itself accessible via the networked environment 245. In some embodiments, the endpoint risk indicator 410 may include a number of files 240 analyzed by the aggregation engine 250. In some embodiments, the endpoint risk indicator 410 may include an amount of data in the files 240 that is determined to contain classified or sensitive information.

The file share risk indicator 415 may present, display, or otherwise include a summary information of the security threats to the files 240 classified as on a file sharing service accessible via the networked environment 245. In some embodiments, the file share risk indicator 415 may include a number of files 240 analyzed by the aggregation engine 250. In some embodiments, the file share risk indicator 415 may include an amount of data in the files 240 that is determined to contain classified or sensitive information. The removable risk indicator 420 may present, display, or otherwise include may present, display, or otherwise include a summary information of the security threats to the files 240 classified as stored on a removable drive itself accessible via the networked environment 245. In some embodiments, the removable risk indicator 420 may include a number of files 240 analyzed by the aggregation engine 250. In some embodiments, the removable risk indicator 420 may include an amount of data in the files 240 that is determined to contain classified or sensitive information.

Figure 5A:
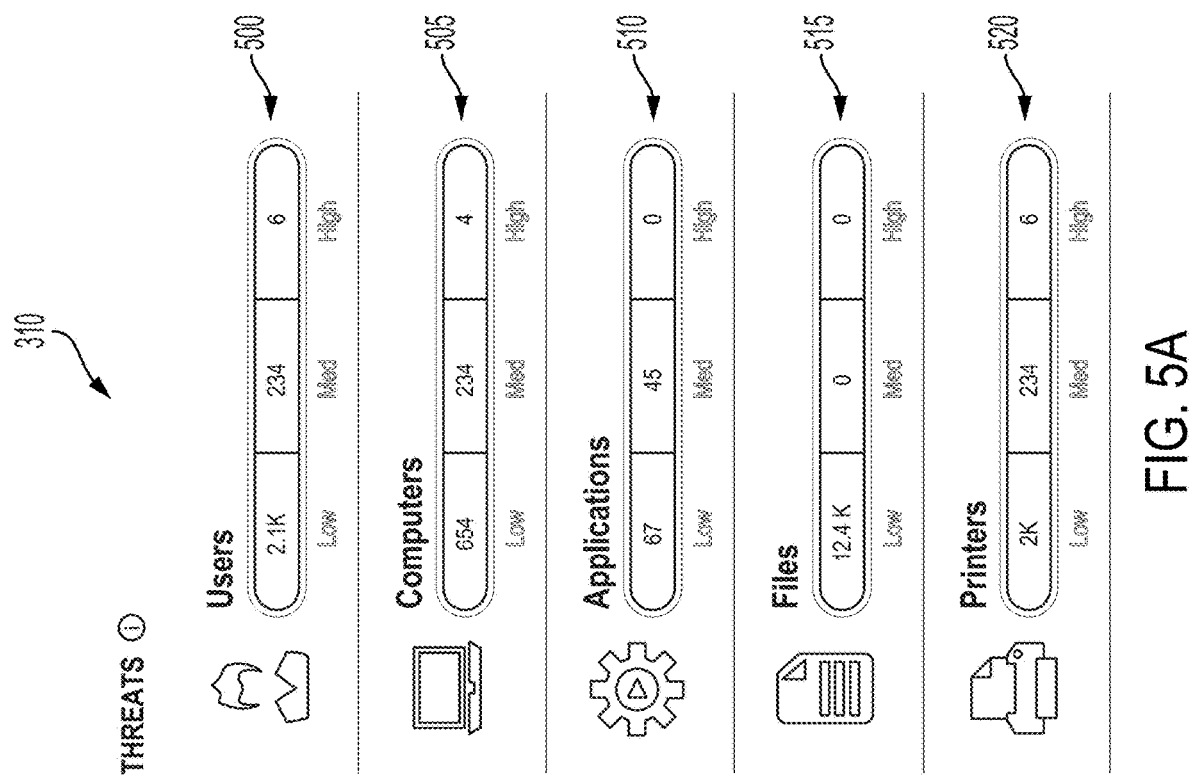
FIGS. 5A and 5B each is an illustration of a threats list of an example user interface in a system for risk tracking.

Referring now to FIG. 5A, depicted is an illustration of the threats list 310 of the user interface 300 in the system 200 for risk tracking. The threats list 310 may present, display, or otherwise include summary information by entity type (e.g., the client device 210, the peripheral device 220, the application 235, or the user 230). The threats list 310 may include at least one users risk component 500, at least one computers risk component 505, at least one applications risk component 510, at least one files risk component 515, and at least one printers risk component 520, among others. Each component 505-520 may display or present the risk categories for each entity type or the files 240 in the networked environment 245. In addition, each component 505-520 may display or present the number of entities of the respective type that are classified with the risk category. The user risk component 500 may include the risk categories ("low," "medium," and "high") over the users 230 to the files 240 of the networked environment 245. The computers risk component 505 may include the risk categories ("low," "medium," and "high") over the client devices 210 to the files 240 of the networked environment 245. The applications risk component 510 may include the risk categories ("low," "medium," and "high") over the applications 235 accessing the files 240 in the networked environment 245.

Figure 5B:
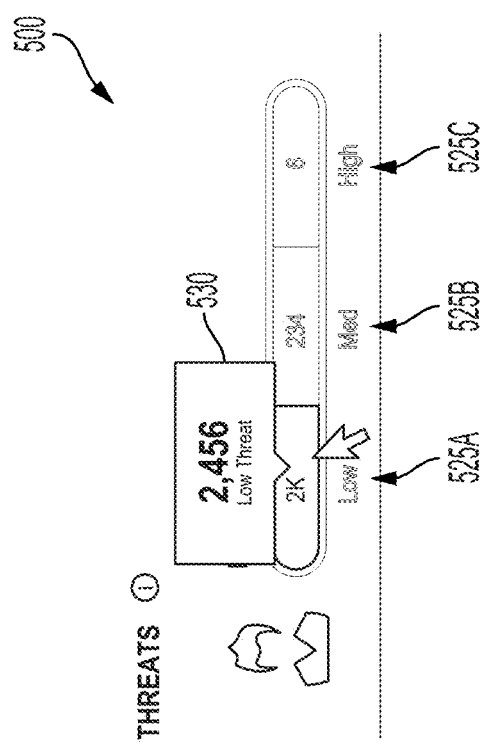

Referring now to FIG. 5B, depicted is an illustration of the users risk component 500 in the threats list 310 of the user interface 300 in the system 200 for risk tracking. The users risk component 500 may include a count for low risk 525A, a count for medium risk 525B, and a count for high risk 525C, among others. The count for low risk 525A may correspond to the number of users 230 classified into a low risk category. The count for medium risk 525B may correspond to the number of users 230 classified into a medium risk category. The count for high risk 525C may correspond to the number of users 230 classified into a high risk category. In addition, each count 525A-525C may include a rounded number for the count in each risk categories over the users 230. Each count 525A-525C in the users risk component 500 may present or display a tool tip that indicates the total raw count of the number of entities (e.g., users 230) classified into the risk category. The other components 510-520 of the threats list 310 may display or present similar information for the respective entity. Upon detecting an interaction with any of the counts 525A-525C, the interface provider 255 may present or display a more detailed lists of users 230 with respect to the corresponding risk category.

Figure 5C:
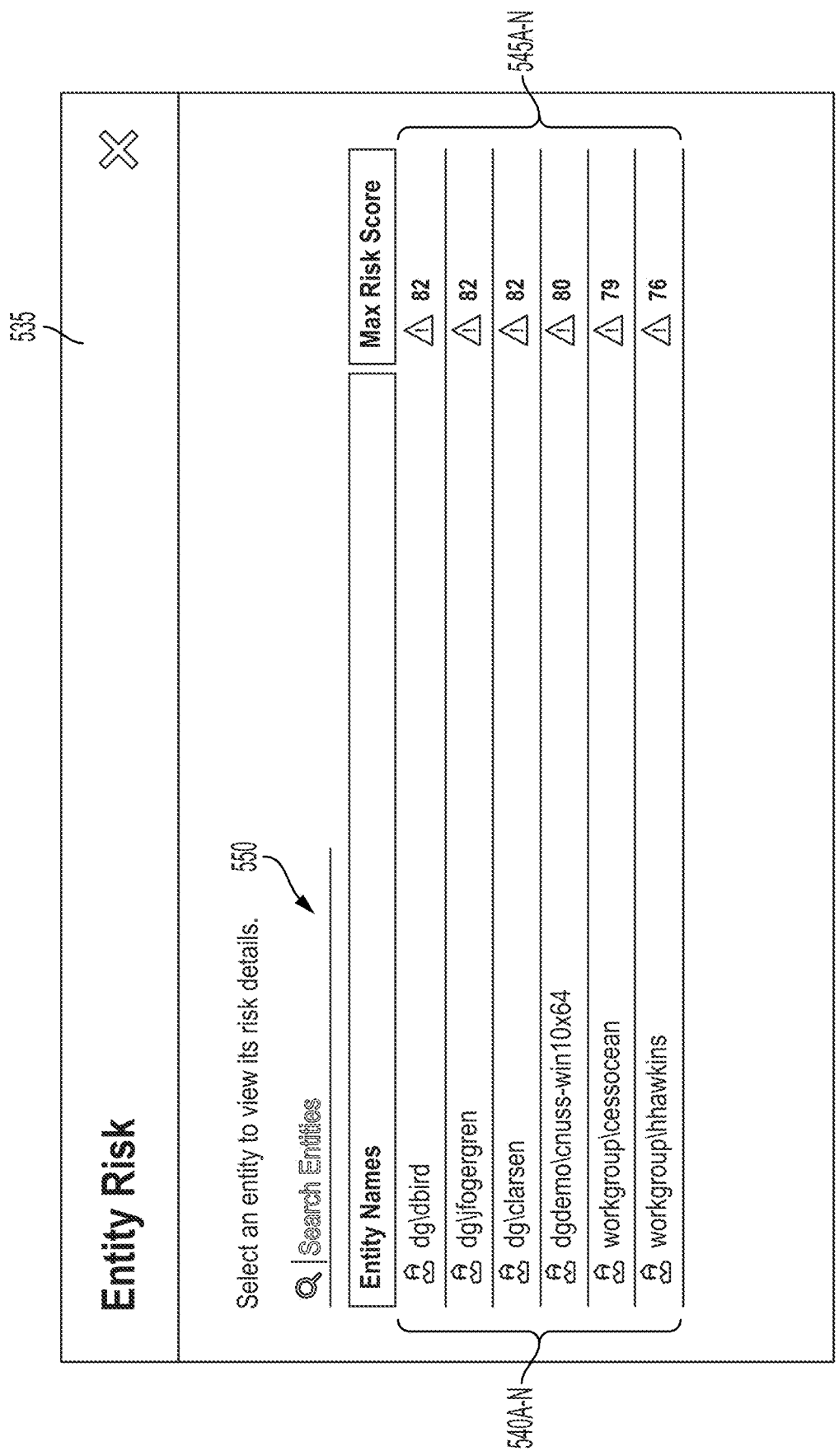
FIG. 5C is an illustration of an entity list dialog in an example user interface in a system for risk tracking.

Referring now to FIG. 5C, depicted is an illustration of an entity list dialog 535 in the user interface 300 in the system 200 for risk tracking. The entity list dialog 535 may present, display, or otherwise include a list of entities 540A-N by risk scores 545A-N. In relation to FIG. 5B, the interface provider 255 may generate and display the entity list dialog 535 in response to an interaction with one of the counts 525A-C. The list of entities 540A-N may include the users 230 with the risk category corresponding to the count 525A-C on which the interaction was detected. For example, as depicted, the entity list dialog 535 may display the account identifiers of the set of users 230 classified into the high risk category. In some embodiments, the list of entities 540A-N may be arranged in ascending or descending order based on the corresponding risk scores 545A-N. In some embodiments, the entity list dialog 535 may include a search box 550 for finding individual entities 540A-N (e.g., one of the users 230).

Figure 6A:
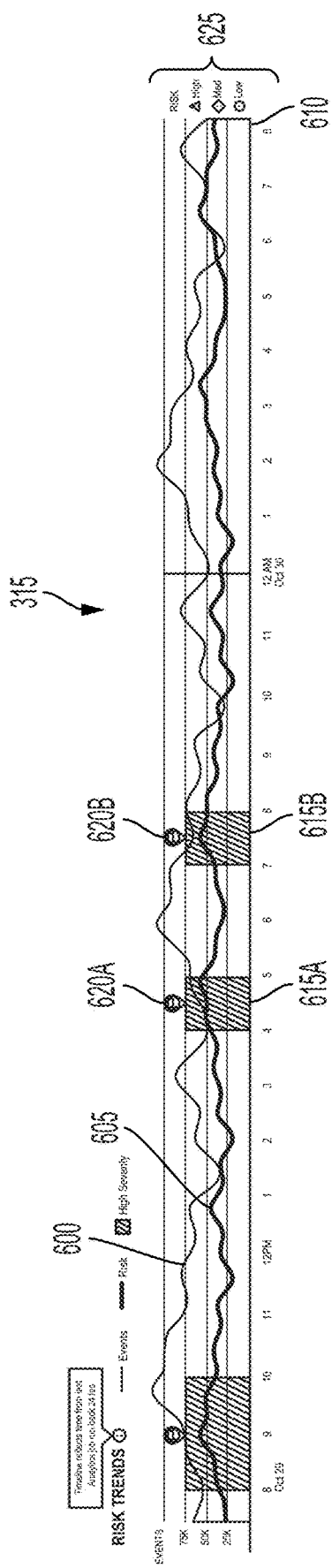
FIGS. 6A and 6B each is an illustration of a risk trend graph in an example user interface in a system for risk tracking.

Referring now to FIG. 6A, depicted is an illustration of the risk trend graph 315 in the user interface 300 in the system 200 for risk tracking. The risk trend graph 315 may present, display, or otherwise include a number of events occurring in accessing the files 240 of the networked environment and an overall risk score over a time period. The risk trend graph 315 may include at least one event count line 600 and at least one risk trend line 605 over a set time period 610 (e.g., over 24 hours as depicted). The count line 600 may indicate a number of events occurring in the networked environment 245 in accessing the files 240 during the set time period 610. The number of events may be along the y-axis of the risk trend graph 315, while the time may be along the x-axis of the risk trend graph 315. The risk trend line 605 may indicate an overall risk score to the files 240 over the set time period 610. The overall risk score may be along the y-axis of the risk trend graph 315, while the time may be along the x-axis of the risk trend graph 315. In some embodiments, the overall risk score shown in the risk trend line 605 may correspond to a highest risk score at each time instance over the set time period 610. In some embodiments, the risk trend graph 315 may include a set of risk zones 615A-N. Each risk zone 615A-N may be associated with a corresponding marker 620A-N. Each risk zone 615A-N may be presented as a highlight area (e.g., as depicted) associated with the corresponding time marker 620A-N. Each risk zone 615A-N and the corresponding markers 620A-N may correspond to a time span within the time period 610 in which the overall risk score is greater than the threshold score. Upon interaction with one of the markers 620A-N, the interface provider 255 may generate and present an entity list dialog to show the entities that are causing the overall risk score being greater than the threshold score. In addition, the risk trend graph 315 may include a risk category legend 625 to indicate the delineation of the categories of risk. The generation of the risk trend graph 315 may be customized or configured in accordance with a script, for example, of the following form:

```
{
    "element_id": "risk-trend-line",
    "name": "Alert Trend",
    "module": "Workspace",
    "type": "risk-trend-line",
    "selected": false,
    "order": 2,
    "body": {
        "query": [
            {
                "chartType": "area",
                "filter": { },
                "attributes": [ {
                    "field": "*",
                    "order": "none",
                    "aggregate": "count",
                    "type": "show",
                    "hidden": false
                },
                {
                    "field": "dg_time",
                    "order": "none",
                    "aggregate": "day",
                    "type": "by",
                    "hidden": false
                } ],
                "data types": [ ],
                "size": 1000,
                "detail": false,
                "data_types_group": "ueba"
                "context": "ueba"
            }, {
                "chartType": "line",
                "filter": { },
                "attributes": [ {
                    "field": "ueba_risk",
                    "order": "none",
                    "aggregate": "max",
                    "type": "show",
                    "hidden": false
                },
                {
                    "field": "dg_time",
                    "order": "none",
                    "aggregate": "day",
                    "type": "by",
                    "hidden": false
                } ],
                "data_types": [ ],
                "size": 1000,
                "detail": false,
                "data_types_group": "ueba"
                "context": "ueba"
            } ],
            "chart_options": {
                "chart_type": "composite",
                "labels": {
                    "*": "Total",
                    "dg_time": "Event Time"
                },
                "sortBy": [ ],
                "showLabels": true,
                "columnWidth": { },
                "showLegend": true
            },
            "note": {
                "text": "default",
                "size": 0
            },
            "isAllDataType": false
        },
        "layout": {
            "size": {
                "x": 24,
                "y": 6
            },
            "position": {
                "row": 6,
                "col": 0
            }
        }
    }
}
```

Figure 6B:
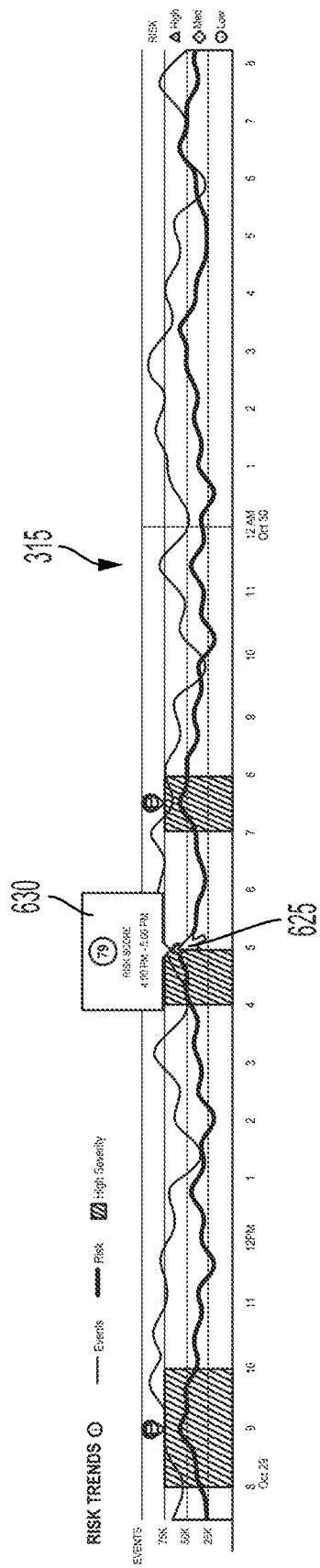
Figure 6C:
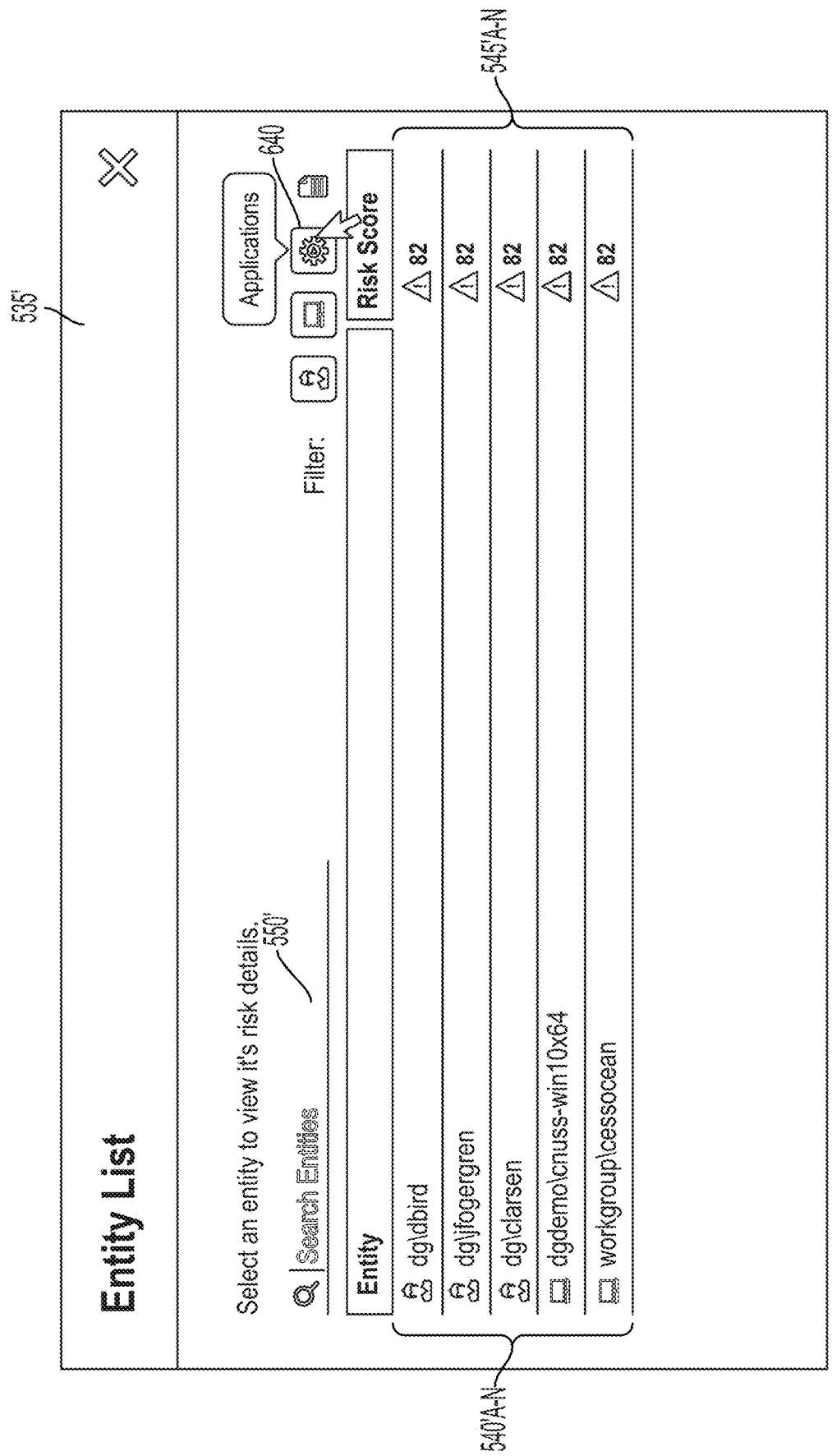
FIG. 6C is an illustration of an entity list dialog in an example user interface in a system for risk tracking.

Referring now to FIG. 6B, depicted is an illustration of the risk trend graph 315 in the user interface 300 in the system 200 for risk tracking. The risk trend graph 315 may present, display, or otherwise include a tool tip box 630 at a point 635 on the risk trend line 605. The tool tip box 630 may include the overall risk score time at the time instance within the time period 610 corresponding to the point 635. Referring now to FIG. 6C, depicted is an illustration of an entity list dialog 535' in an example user interface in the system 200 for risk tracking. The entity list dialog 535' may present, display, or otherwise include a list of entities 540'A-N by risk scores 545'A-N. In relation to FIG. 6A or 6B, the interface provider 255 may generate and display the entity list dialog 535' in response to an interaction with one of the markers 620A-N or point 635. The list of entities 540'A-N may include the users 230 with the risk category corresponding to one of the markers 620A-N or point 635 on which the interaction was detected. For example, as depicted, the entity list dialog 535' may display the account identifiers of the set of users 230 classified into the high risk category at the time instance corresponding to the associated marker 620A-N or point 635. In some embodiments, the list of entities 540'A-N may be arranged in ascending or descending order based on the corresponding risk scores 545'A-N. In some embodiments, the entity list dialog 535' may include a search box 550' for finding individual entities 540'A-N (e.g., one of the users 230). Further breakdown on the risk scores 545A-N by the applications 235 may be shown via interaction with an applications filter 640.

Figure 6D:
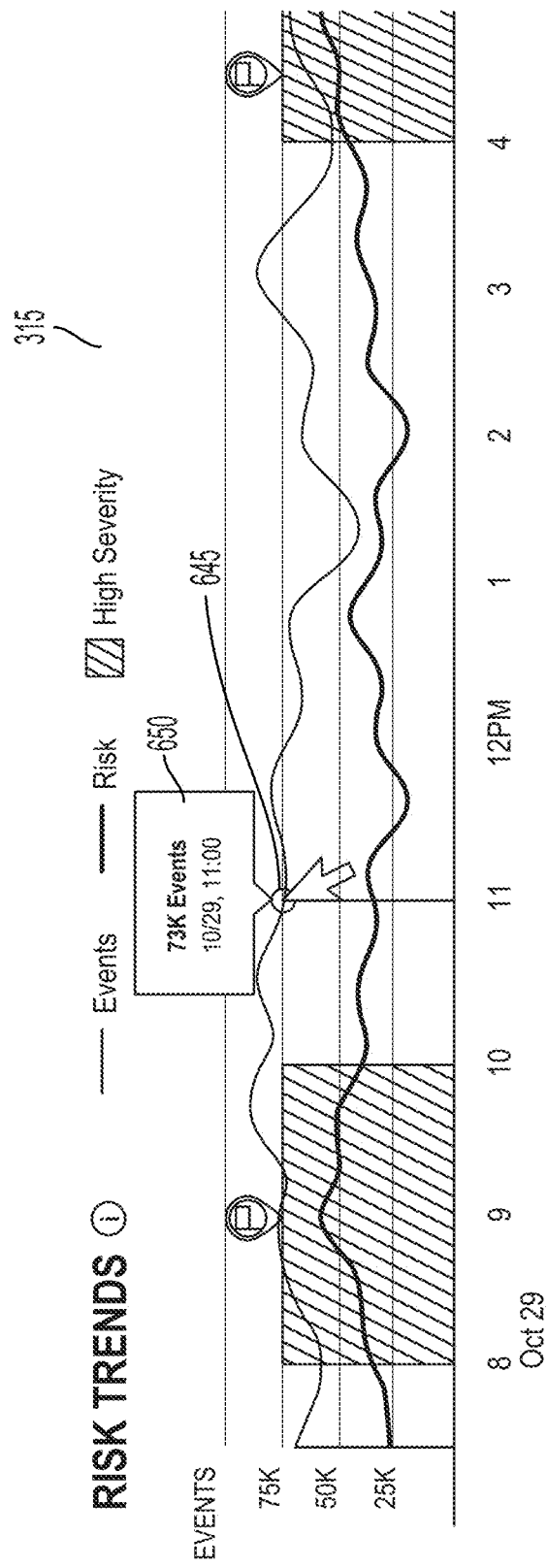
FIG. 6D is an illustration of a risk trend graph in an example user interface in a system for risk tracking.

Referring now to FIG. 6D, depicted is an illustration of the risk trend graph 315 in an example user interface in the system 200 for risk tracking. The risk trend graph 315 may present, display, or otherwise include a tool tip box 650 at a point 645 on the event count line 600. The tool tip box 650 may include the number of events in accessing the files 240 of the networked environment 245 at the time instance within the time period 610 corresponding to the point 645. Referring now to FIG. 6E, depicted is an illustration of an event details list 655 in the user interface 315 in the system 200 for risk tracking. The events detail list 655 may present, display, or otherwise include a list of events 660A-N occurring in accessing the files 240 of the networked environment 245. The events detail list 655 may be generated by the interface provider 255 and displayed in response to detecting an interaction on the point 645 on the event count line 600. The list of events 660A-N may include events within a time span from the point 645 (e.g., an hour about the time instance corresponding to the point 645 on the event count line 600). For each logged event 660A-N, the events detail list 655 may also include: an event time 665 (corresponding to the timestamp of the event), a type of operation, a user 230 identified by an account identifier, a computer name corresponding to one of the client devices 210, and an application name corresponding to one of the applications 235, among others.

Figure 7A:
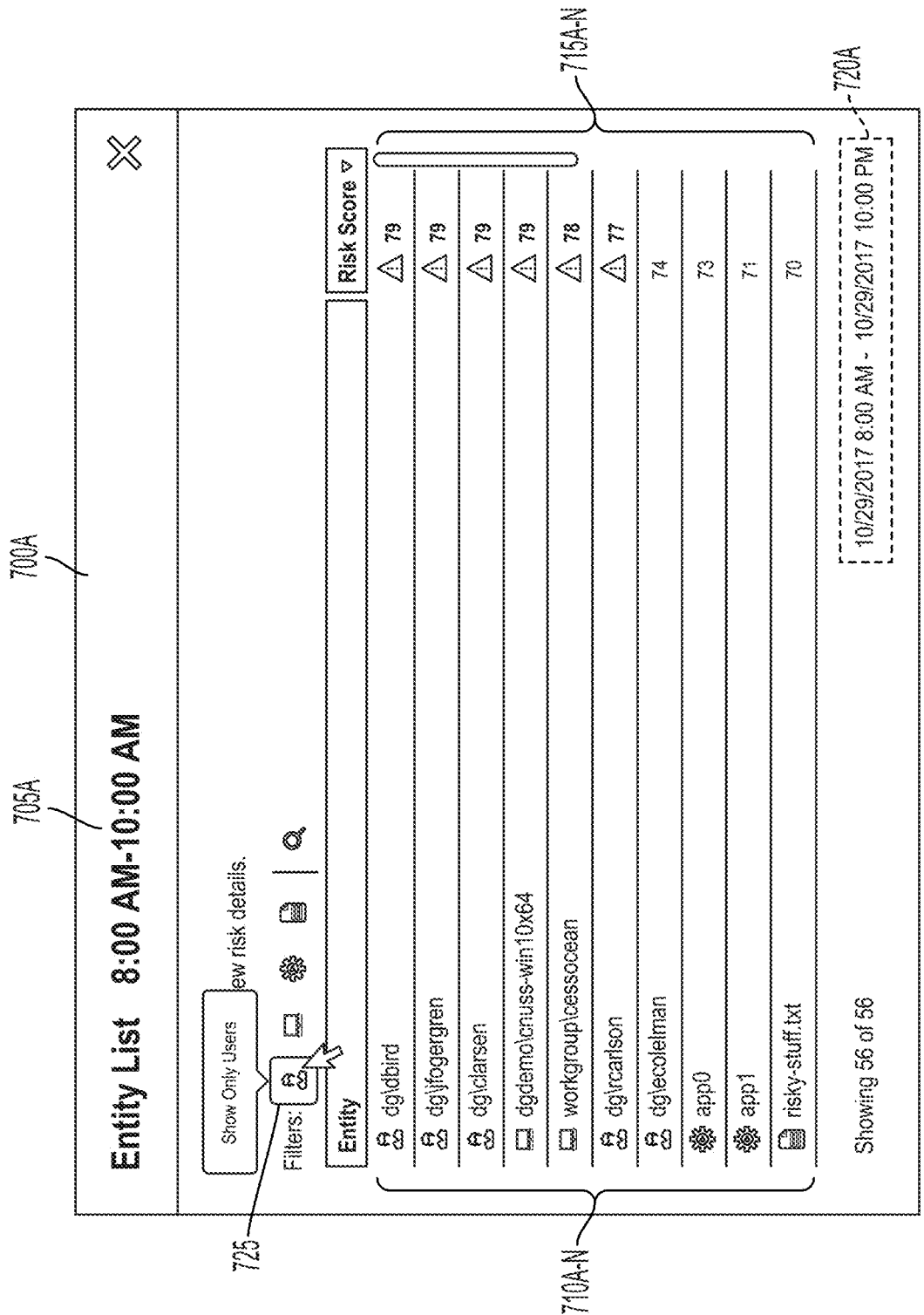

Referring now to FIG. 7A, depicted is an illustration of an entity list dialog 700A in the user interface 300 in the system 200 for risk tracking. The entity list dialog 700A generated and presented by the interface provider 255 may include a filter 705A, a set of entities 710A-N satisfying the filter 705A, and a set of risk scores 715A-N for each entity 710A-N. In the example depicted, the filter 705A may be a time span between 8:00 AM and 10:00 AM. The set of entities 715A-N may include users 230 identified using account identifiers, applications 235 identified with application names, and files 240 identified by file names, among others. For each listed entity 715A-N, the entity list dialog 700A may include a risk score 715A-N. In some embodiments, the entity list dialog 700A may include a time range 720A indicating a span of time in which the events associated with the entities 710A-N occur. In this example, the time range 720A may be Oct. 20, 2017 between 8:00 AM and 10:00 AM. In addition, the entity list dialog 700A may further include a set of filters 725. The set of filers 725 may include entity types, such as users 230 (e.g., shown as highlighted), computers (corresponding to client devices 210), applications 235, files 240, and printers (corresponding to peripheral devices 220), among others.

Referring now to FIG. 7B, depicted is an illustration of an entity list dialog 700B in the user interface 300 in the system 200 for risk tracking. The entity list dialog 700B generated and presented by the interface provider 255 may include a filter 705B, a set of entities 710'A-N satisfying the filter 705B, and a set of risk scores 715'A-N for each entity 710'A-N. The filter 705B may be set to entities classified with the risk category of "high risk." Further, the set of entities 710'A-N shown in the entity list dialog 700B may be narrowed down to the users 230. As such, the set of entities 710'A-N may include users 230 accessing files 240 in the networked environment 245. Each risk score 715'A-N may be for a corresponding entity 710'A-N. In addition, the time range 720B may be Oct. 20, 2017 at 8:00 AM.

Figure 7C:
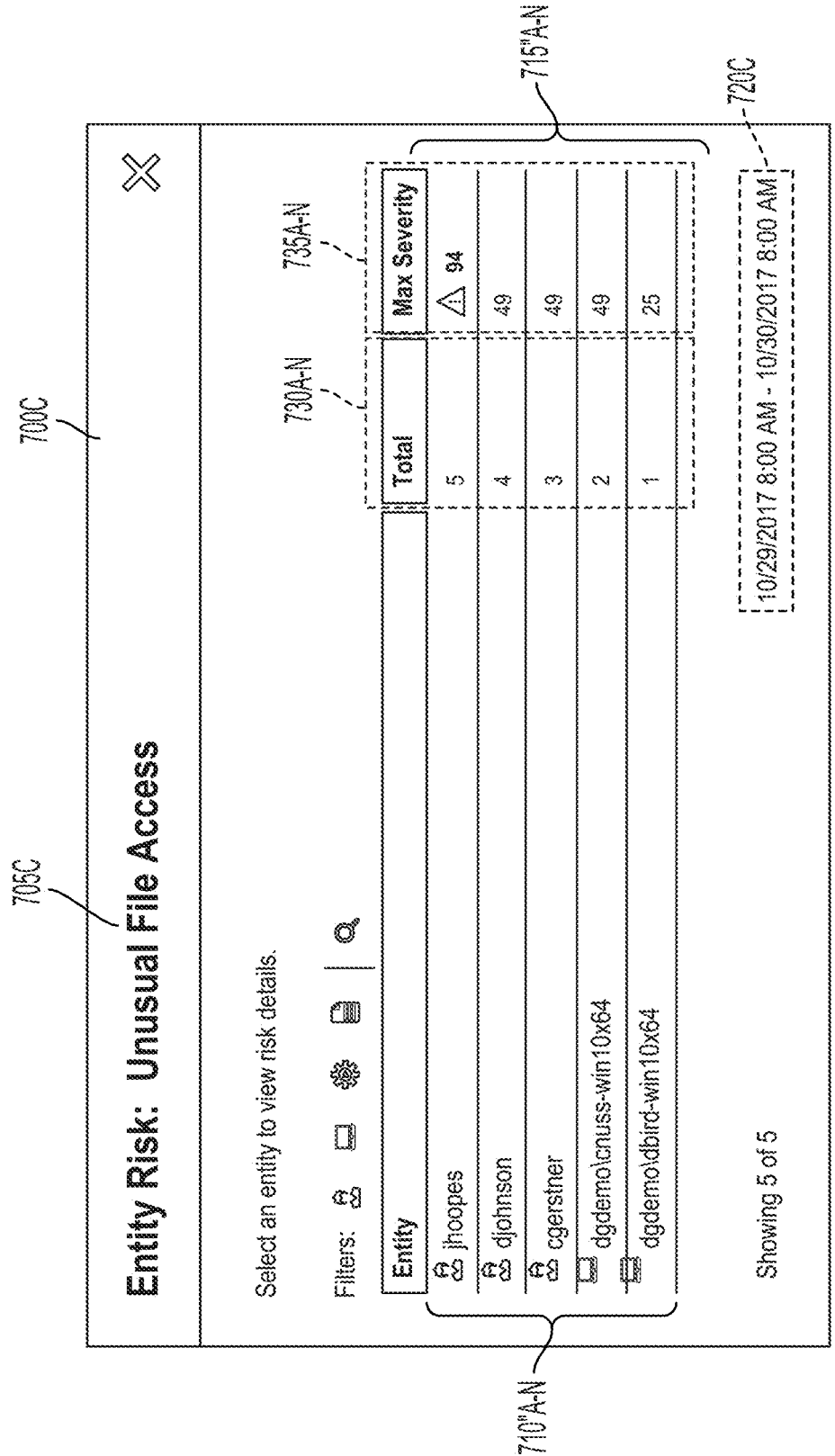

Referring now to FIG. 7C, depicted is an illustration of an entity list dialog 700C in the user interface 300 in the system 200 for risk tracking. The entity list dialog 700C generated and presented by the interface provider 255 may include a filter 705C, a set of entities 710"A-N satisfying the filter 705C, and a set of risk scores 715"A-N for each entity 710"A-N. The set of entities 710"A-N may include users 230 identified using account identifiers and applications 235 identified with application names. The filter 705C may be set to entities identified as having performed an unusual file access. The risk scores 715"A-N for each entity 710"A-N may be divided into a total count 730A-N and a maximum severity 735A-N. The total count 730A-N may correspond to a number of unusual file accesses for the entity 710"A-N. The maximum severity 735A-N may correspond to the highest risk score determined for the entity 710"A-N. In addition, the time range 720C may be Oct. 20, 2017 at 8:00 AM.

Figure 8:
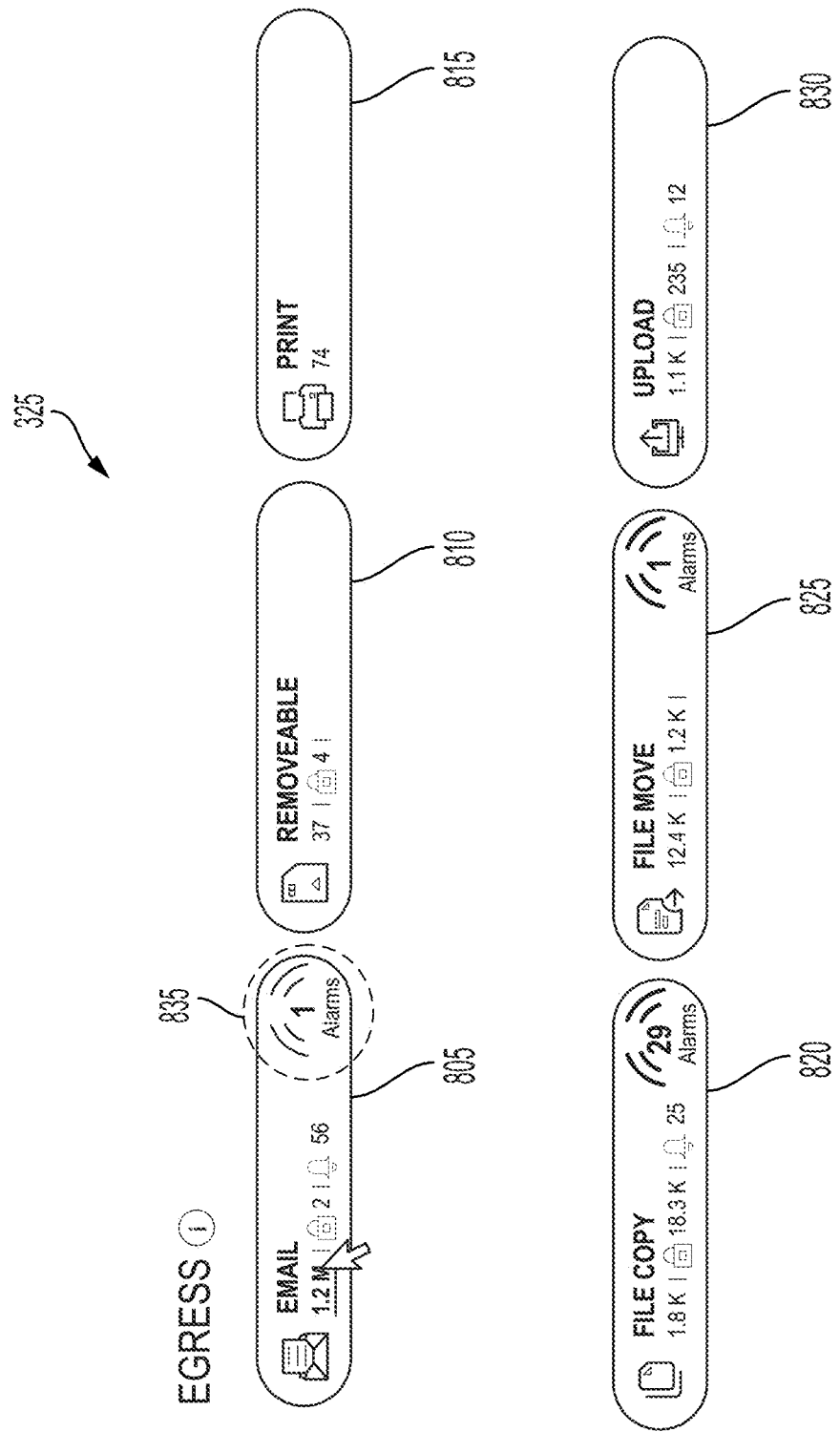
FIG. 8 is an illustration of an egress list in an example user interface in a system for risk tracking.

Referring now to FIG. 8, depicted is an illustration of an egress points list 325 in the user interface 300 in the system 200 for risk tracking. The egress points list 325 may include at least one electronic mail report component 805, at least one removable drive report component 810, at least one printer report component 815, at least one file copy operation report component 820, at least one file move operation report component 825, and at least one network upload report component 830, among others. Each report component 805-830 may present, display, or otherwise include a number of events in which the corresponding egress point type was used to transfer a file 240. Each report component 805-830 may also include a number of files 240 in which the corresponding egress point type was used to transfer the files 240 with a particular risk category (e.g., classified file). In addition, each report component 805-830 may include the number of alerts corresponding to attempts to transfer the files 240 through the corresponding egress point (e.g., files 240 marked as high risk). Furthermore, at least one of the report components 805-830 may have an alarm indicator 835. The alarm indicator 835 may signify that an occurrence of a specified condition (e.g., transferal of the file 240 with high risk).

The electronic mail report component 805 may include: the number of events in which electronic mail was used to transfer a file 240, the number of files 240 with a particular risk category transferred via electronic mail, and the number of alerts from files 240 transferred via electronic mail. The removable drive report component 810 may include: the number of events in which removable drive was used to transfer a file 240, the number of files 240 with a particular risk category transferred via removable drive, and the number of alerts from files 240 transferred via removable drive. The printer report component 815 may include: the number of events in which printer (or peripheral device 220) was used to transfer a file 240, the number of files 240 with a particular risk category transferred via the printer, and the number of alerts from files 240 transferred via the printer. The file copy report component 820 may include: the number of events in which a file copy operation was used to transfer a file 240, the number of files 240 with a particular risk category transferred via the file copy operation, and the number of alerts from files 240 transferred via the file copy operation. The file move report component 825 may include: the number of events in which a file move operation was used to transfer a file 240, the number of files 240 with a particular risk category transferred via the file move operation, and the number of alerts from files 240 transferred via the file move operation. The network upload component 830 may include: the number of events in which a network upload was used to transfer a file 240, the number of files 240 with a particular risk category transferred via the network upload, and the number of alerts from files 240 transferred via the network upload.

Figures 9A, 9B, 9C:
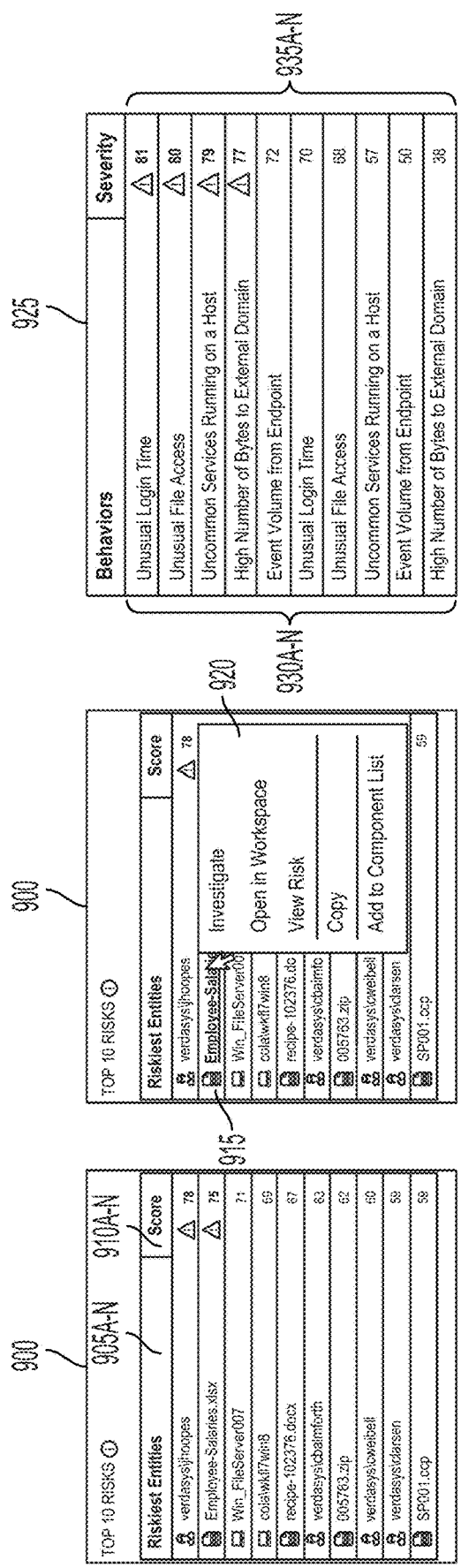
FIGS. 9A-9C each is an illustration of a risk cause list in an example user interface in a system for risk tracking.

Referring now to FIG. 9A, depicted is an illustration of a risk cause list 900A in the user interface 300 in the system 200 for risk tracking. The risk cause list 900 may be part of the risky entities list 320 of the user interface 300 generated and presented by the interface provider 255. The risk cause list 900A may include a set of riskiest entities 905A-N and a set of risk scores 910 for each corresponding entity 905A-N. The set of riskiest entities 905A-N may include users 230 identified by account identifiers, client devices 210 identified by computer name, files 230 identified by file name, and applications 235 identified by application name, among others, with the highest risk scores in the networked environment 245. Referring now to FIG. 9B, depicted is an illustration of a risk cause list 900 in the user interface 300 in the system 200 for risk tracking. To obtain a detailed view, one of the entities (e.g., file 240 with file name of "Employee-Salaries.xlsx") may be interacted with by the user of the user interface 300 to retrieve a menu 920. The menu 920 may be generated and presented by the interface provider 255. The menu 920 may provide options with respect to the highlighted entity. Referring now to FIG. 9C, depicted is an illustration of a risk cause list 925 in the user interface 300 in the system 200 for risk tracking. The risk cause list 925 may be generated and presented by the interface provider 255 in response to a request for further details on one of the entities. The request for further details may correspond to a detection of an interaction on the menu 920 (e.g., with the item "Investigate"). The risk cause list 925 may include a set of behaviors 930A-N and a set of severities 935A-N for the corresponding behavior 930A-N. Each behavior 930A-N may indicate a summary of the event in accessing a file 240 (e.g., classified as high risk) in the networked environment 245. The severity 935 may indicate the highest risk score attributed to the corresponding behavior 930A-N.

Figure 10:
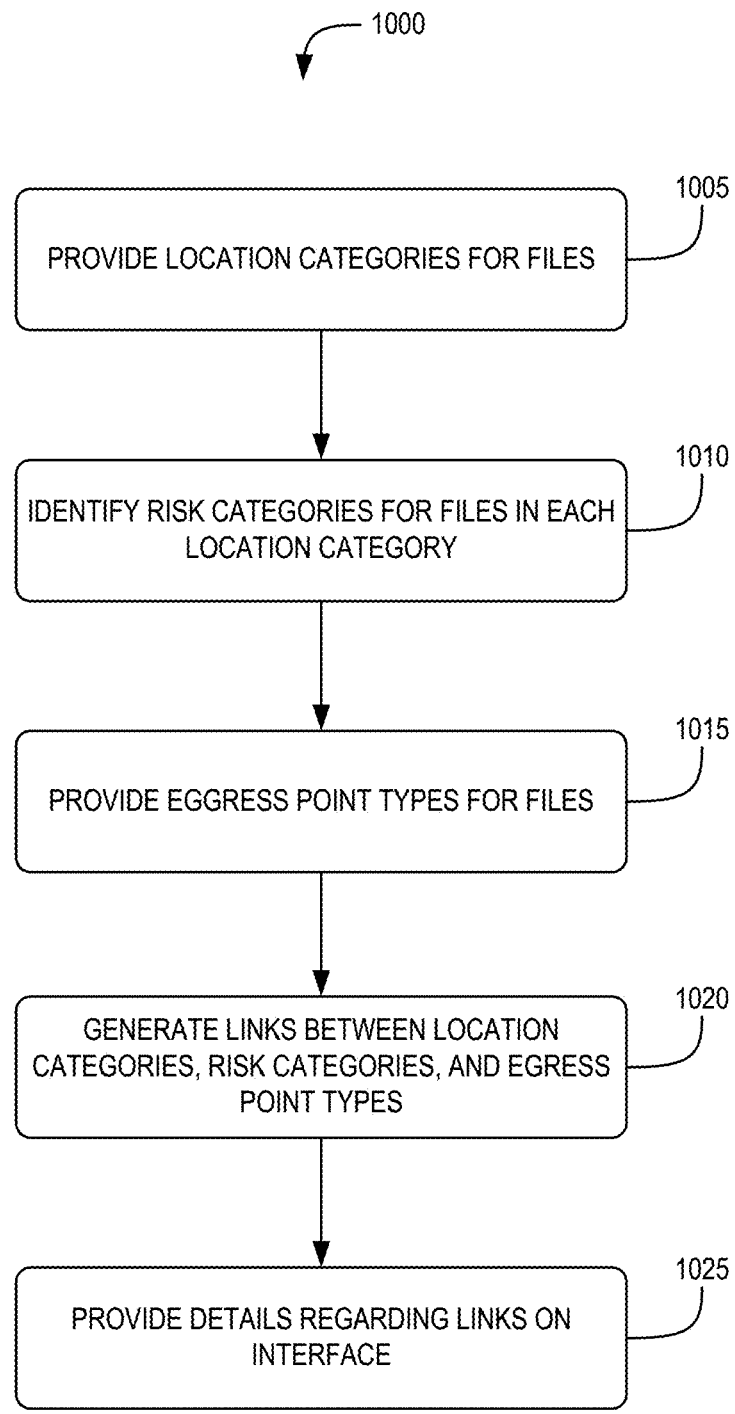
FIG. 10 is a flow diagram depicting an example embodiment of a method of risk tracking.

Referring now to FIG. 10, depicted is a flow diagram of an embodiment of a method 1000 for risk tracking. The method 1000 may be performed, executed, or implemented by any one or more of the components described above in conjunction with FIGS. 1A-1D or the system 200 described above in conjunction with FIG. 2-9C. In brief overview, a tracker engine may provide location categories for files (1005). The tracker engine may identify risk categories for files in each location category (1010). The tracker engine may provide egress point types for files (1015). The tracker engine may generate links between the location categories, the risk categories, and egress point types (1020). The tracker engine may provide details regarding the links on an interface (1025).

In further detail, a tracker engine (e.g., the risk tracking engine 205) may identify, determine, provide and/or display location categories for files (e.g., files 240) (1005). The plurality of categories of locations can include at least one of: a database, a file-share application, an end-point, or a server cloud.

The tracker engine may identify, determine, provide and/or display risk categories for files in each location category (1010). The risk categories of the files include at least one of: classified files, at-risk files, or secure files The tracker engine may identify, determine, provide and/or display egress point types for files (1015). The types of egress points of the files include at least one of: email, removable storage, printer, file copy, file move between locations, or network upload. The tracker engine may provide, for each of the types of egress points of the files, a count of the corresponding egress points and a count of events indicative of a threat associated with the corresponding egress points.

The tracker engine may generate, provide and/or create links between the location categories, the risk categories, and egress point types (1020). The tracker engine may identify, determine, provide and/or display details regarding the links on an interface (e.g., graphical user interface 300) (1025).

The tracker engine may generate an event graph comprising a risk trend graph indicative of an overall risk across entities in the networked environment over a plurality of time units. The tracker engine may identify one or more zones on the event graph corresponding to one or more periods of overall risk above a predefined threshold. Each point of the event graph may be navigable to identify entities contributing to an overall risk at the corresponding point. The tracker engine may provide categories of entities that are identified as threats, and subcategories indicative of risk levels of the threats. The tracker engine may identify a number of riskiest entities and risk scores of the riskiest entities.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Non-limiting examples of various embodiments are disclosed herein. Features from one embodiments disclosed herein may be combined with features of another embodiment disclosed herein as someone of ordinary skill in the art would understand.

As utilized herein, the terms "approximately," "about," "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described without restricting the scope of these features to the precise numerical ranges provided. Accordingly, these terms should be interpreted as indicating that insubstantial or inconsequential modifications or alterations of the subject matter described and are considered to be within the scope of the disclosure.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

What is claimed is:

1. A system for risk tracking, the system comprising:
   at least one server having one or more processors coupled with memory, configured to:
   provide, in a user interface, a plurality of categories of locations for files in a networked environment;
   identify, in the user interface, risk categories of the files in each of the categories of the locations;
   provide, in the user interface, types of egress points for the files; and
   generate, in the user interface, links between the categories of the locations of the files, the risk categories of the files and the types of egress points for the files, wherein details about each of the files is navigable from the user interface via a corresponding category of a location of the file, a corresponding risk category of the file or a corresponding type of egress point for the file.

2. The system of claim 1, wherein the plurality of categories of locations includes at least one of: a database, a file-share application, an end-point, or a server cloud.

3. The system of claim 1, wherein the risk categories of the files include at least one of: classified files, at-risk files, or secure files.

4. The system of claim 1, wherein the types of egress points of the files include at least one of: email, removable storage, printer, file copy, file move between locations, or network upload.

5. The system of claim 1, wherein the at least one server is further configured to provide, for each of the types of egress points of the files, a count of the corresponding egress points and a count of events indicative of a threat associated with the corresponding egress points.

6. The system of claim 1, wherein the at least one server is further configured to generate an event graph comprising a risk trend graph indicative of an overall risk across entities in the networked environment over a plurality of time units.

7. The system of claim 6, wherein the at least one server is further configured to identify one or more zones on the event graph corresponding to one or more periods of overall risk above a predefined threshold.

8. The system of claim 6, wherein each point of the event graph is navigable to identify entities contributing to an overall risk at the corresponding point.

9. The system of claim 1, wherein the at least one server is further configured to provide categories of entities that are identified as threats, and subcategories indicative of risk levels of the threats.

10. The system of claim 1, wherein the at least one server is further configured to identify a number of riskiest entities and risk scores of the riskiest entities.

11. A method for risk tracking, the method comprising:
providing, by a tracker engine executable on one or more servers, in a user interface, a plurality of categories of locations for files in a networked environment;
identifying, by the tracker engine in the user interface, risk categories of the files in each of the categories of the locations;
providing, by the tracker engine in the user interface, types of egress points for the files; and
generating, by the tracker engine in the user interface, links between the categories of the locations of the files, the risk categories of the files and the types of egress points for the files, wherein details about each of the files is navigable from the user interface via a corresponding category of a location of the file, a corresponding risk category of the file or a corresponding type of egress point for the file.

12. The method of claim 11, wherein the plurality of categories of locations includes at least one of: a database, a file-share application, an end-point, or a server cloud.

13. The method of claim 11, wherein the risk categories of the files include at least one of: classified files, at-risk files, or secure files.

14. The method of claim 11, wherein the types of egress points of the files include at least one of: email, removable storage, printer, file copy, file move between locations, or network upload.

15. The method of claim 11, comprising providing, by the tracker engine, for each of the types of egress points of the files, a count of the corresponding egress points and a count of events indicative of a threat associated with the corresponding egress points.

16. The method of claim 11, comprising generating, by the tracker engine, an event graph comprising a risk trend graph indicative of an overall risk across entities in the networked environment over a plurality of time units.

17. The method of claim 16, providing identifying, by the tracker engine, one or more zones on the event graph corresponding to one or more periods of overall risk above a predefined threshold.

18. The method of claim 16, wherein each point of the event graph is navigable to identify entities contributing to an overall risk at the corresponding point.

19. The method of claim 11, wherein providing, by the tracker engine, categories of entities that are identified as threats, and subcategories indicative of risk levels of the threats.

20. The method of claim 11, wherein identifying, by the tracker engine, a number of riskiest entities and risk scores of the riskiest entities.

* * * * *